US011209973B2

(12) United States Patent
Ishida

(10) Patent No.: US 11,209,973 B2
(45) Date of Patent: Dec. 28, 2021

(54) INFORMATION PROCESSING APPARATUS, METHOD, AND MEDIUM TO CONTROL ITEM MOVEMENT BASED ON DRAG OPERATION

(71) Applicant: CANON KABUSHIKI KAISHA, Tokyo (JP)

(72) Inventor: Tomoya Ishida, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 68 days.

(21) Appl. No.: 16/144,745

(22) Filed: Sep. 27, 2018

(65) Prior Publication Data
US 2019/0102060 A1 Apr. 4, 2019

(30) Foreign Application Priority Data

Oct. 3, 2017 (JP) .............................. JP2017-193783

(51) Int. Cl.
*G06F 3/0486* (2013.01)
*G06F 3/0481* (2013.01)
*G06F 3/0484* (2013.01)
*G06F 3/0483* (2013.01)

(52) U.S. Cl.
CPC .......... *G06F 3/0486* (2013.01); *G06F 3/0483* (2013.01); *G06F 3/04817* (2013.01); *G06F 3/04845* (2013.01)

(58) Field of Classification Search
CPC ............... G06F 3/04817; G06F 3/0483; G06F 3/04845; G06F 3/0486
See application file for complete search history.

(56) References Cited

U.S. PATENT DOCUMENTS

| 6,411,283 | B1 * | 6/2002 | Murphy | G06F 3/041 |
| | | | | 178/18.01 |
| 6,567,070 | B1 * | 5/2003 | Light | G06F 3/04842 |
| | | | | 345/157 |
| 2006/0010402 | A1 * | 1/2006 | Undasan | G06F 3/04815 |
| | | | | 715/861 |
| 2011/0260997 | A1 * | 10/2011 | Ozaki | G06F 1/1618 |
| | | | | 345/173 |

(Continued)

FOREIGN PATENT DOCUMENTS

| JP | 2000-035842 A | 2/2000 |
| JP | 2011-227821 A | 11/2011 |

(Continued)

*Primary Examiner* — Eric J. Bycer
(74) *Attorney, Agent, or Firm* — Canon U.S.A., Inc. IP Division

(57) ABSTRACT

An information processing apparatus includes a control unit configured to control movement of an item in accordance with a drag operation by a user and an obtaining unit configured to obtain an input position of the drag operation by the user in the display area. In a case where the item is moved from a predetermined position in the display area to a first end part side in the display area by the drag operation, the control unit moves the item in a manner that a relative position of the item with respect to an input position of the drag operation on the first end part side is shifted to the first end part side as compared with a relative position of the item with respect to an input position of the drag operation at the predetermined position.

17 Claims, 32 Drawing Sheets

(56) References Cited

U.S. PATENT DOCUMENTS

| | | | |
|---|---|---|---|
| 2011/0265022 A1* | 10/2011 | Kamiyama | G06F 3/04812 715/769 |
| 2014/0047369 A1* | 2/2014 | Schiller | G06F 3/0486 715/769 |
| 2014/0237420 A1* | 8/2014 | Song | G06F 3/04845 715/790 |
| 2016/0170600 A1* | 6/2016 | Horiike | G06F 3/0486 715/769 |

FOREIGN PATENT DOCUMENTS

| | | |
|---|---|---|
| JP | 2015-181071 A | 10/2015 |
| JP | 2016-115337 A | 6/2016 |

* cited by examiner

FIG. 7

| IMAGE ID | CAPTURING DATE AND TIME | FOCUS | NUMBER OF FACES | INDIVIDUAL ID | | | | | | | |
|---|---|---|---|---|---|---|---|---|---|---|---|
| | | | | 1 | | 2 | | 3 | | | |
| | | | | UPPER LEFT POSITION | LOWER RIGHT POSITION | UPPER LEFT POSITION | LOWER RIGHT POSITION | UPPER LEFT POSITION | LOWER RIGHT POSITION | | ... |
| 1 | 2015/7/1 10h11m12s | ○ | 6 | 40, 40 | 65, 65 | 90, 40 | 115, 65 | 10, 20 | 25, 35 | | ... |
| 2 | 2015/7/1 10h12m30s | ○ | 2 | 50, 100 | 100, 150 | 150, 125 | 190, 165 | 150, 125 | 190, 165 | | ... |
| 3 | 2015/7/1 10h15m54s | ○ | 0 | - | - | - | - | - | - | | ... |
| ... | ... | ... | ... | ... | ... | ... | ... | ... | ... | | ... |

FIG. 9

| SCENE | CAPTURING PERIOD (HOURS) | | NUMBER OF CAPTURED IMAGES (PHOTOS) | | NUMBER OF CAPTURED PEOPLE (INDIVIDUALS) | |
|---|---|---|---|---|---|---|
| | AVERAGE | STANDARD DEVIATION | AVERAGE | STANDARD DEVIATION | AVERAGE | STANDARD DEVIATION |
| TRAVEL | 33.221 | 4.778 | 324.857 | 393.691 | 1.506 | 0.256 |
| DAILY LIFE | 3.336 | 4.671 | 54.892 | 108.805 | 1.465 | 0.974 |
| CEREMONY | 4.634 | 1.532 | 165.457 | 71.055 | 2.547 | 0.527 |

FIG. 10A

| SCENE | MAIN SLOT IMAGE FEATURE | SUB SLOT IMAGE FEATURE |
|---|---|---|
| TRAVEL | IMAGE INCLUDING PERSON AND LANDSCAPE | CLOSE-UP OR SIDE FACE IMAGE |
| DAILY LIFE | CLOSE-UP OR SIDE FACE IMAGE | IMAGE INCLUDING PERSON AND LANDSCAPE |
| CEREMONY | IMAGE IN WHICH TWO PEOPLE ARE CLOSE TO EACH OTHER | IMAGE INCLUDING MANY PEOPLE |

FIG. 10B

| IMAGE ID | SCORE (OUT OF 50 POINTS) | |
|---|---|---|
| | MAIN SLOT (POINTS) | SUB SLOT (POINTS) |
| 1 | 20 | 40 |
| 2 | 45 | 10 |
| 3 | 10 | 20 |
| ... | ... | ... |

DATE AND TIME

INFORMATION PROCESSING APPARATUS, METHOD, AND MEDIUM TO CONTROL ITEM MOVEMENT BASED ON DRAG OPERATION

BACKGROUND

Field of the Disclosure

The present disclosure generally relates to information processing and, more particularly, to an information processing apparatus, a display control method, and a storage medium. In particular, the disclosure relates to a technology for performing item display control.

Description of the Related Art

A method of moving an item such as an application icon to another page by a drag and drop operation in an operation on a touch panel such as a smart phone or a tablet terminal has been proposed. In the case of this method, first, a user drags the icon to be moved to a left or right end of a screen to sequentially turn over pages. When a desired page is displayed, release is performed from the left or right end of the screen of the icon to drop in the page, and the icon is rearranged in the desired page.

According to Japanese Patent Laid-Open No. 2016-115337, an operability for shifting the icon from a current page to another page is improved by the drag and drop operation. According to Japanese Patent Laid-Open No. 2016-115337, the page is turned over when the dragged icon contacts an end part of a display frame for a predetermined period of time.

According to Japanese Patent Laid-Open No. 2016-115337, a finger or pen that performs the drag operation erroneously runs off from the display frame in some times in the user operation for causing the item such as the dragged icon to contact the end part of the display frame. At this time, since the finger or pen is released from a touch sensor, the drag operation is cancelled, and an issue occurs that the page turning operation is cancelled. Not only in a case where the item is moved by the finger or pen but also in a case where the item is moved by using a mouse, the drag operation is cancelled when the finger is released from the mouse before the item is caused to contact the end part of the display frame, and a similar issue may occur.

SUMMARY

The present disclosure provides improvements in information processing technology in view of the above-described issues and aims at further improving a usability for the user when the item is moved.

According to one or more aspects of the present disclosure, an information processing apparatus is related to an information processing apparatus that displays an item in a display area of a display unit, the information processing apparatus including a control unit configured to control movement of the item in accordance with a drag operation by a user and an obtaining unit configured to obtain an input position of the drag operation by the user in the display area, in which, in a case where the item is moved from a predetermined position in the display area to a first end part side in the display area by the drag operation, the control unit moves the item in a manner that a relative position of the item with respect to an input position of the drag operation on the first end part side is shifted to the first end part side as compared with a relative position of the item with respect to an input position of the drag operation at the predetermined position.

Further features of the present disclosure will become apparent from the following description of exemplary embodiments with reference to the attached drawings.

BRIEF DESCRIPTION OF THE DRAWINGS

FIG. 7 is an explanatory diagram for describing image analysis information in the automatic layout processing.

FIG. 9 is an explanatory diagram for describing scene classification in the automatic layout processing.

FIGS. 10A and 10B are explanatory diagrams for describing image scores in the automatic layout processing.

DESCRIPTION OF THE EMBODIMENTS

Various exemplary embodiments, features, and aspects of the present disclosure will be described in detail with reference to the accompanying drawings. It should be noted that the following exemplary embodiments are not intended to limit the present disclosure, and also all of combinations of features described according to the present exemplary embodiment are not necessarily indispensable to solutions of the present disclosure.

First Exemplary Embodiment

According to the present exemplary embodiment, an application for creating a photo album (photo book) constituted by a plurality of pages where images such as photos (photographs) are laid out will be described as an example. In the case of the above-described application, after the images are automatically arranged and laid out, an editing screen is provided such that a user can edit the laid-out images. According to the present exemplary embodiment, when the image serving as an item is moved by a drag operation on this editing screen, a position of the image is controlled on the basis of an input position (for example, a touch position) of the drag operation by the user in a display area. Hereinafter, first, configurations of a system and an apparatus and a layout method for the images will be described, and then, editing of a layout result and a display control method will be described.

System Configuration

Figure 1:
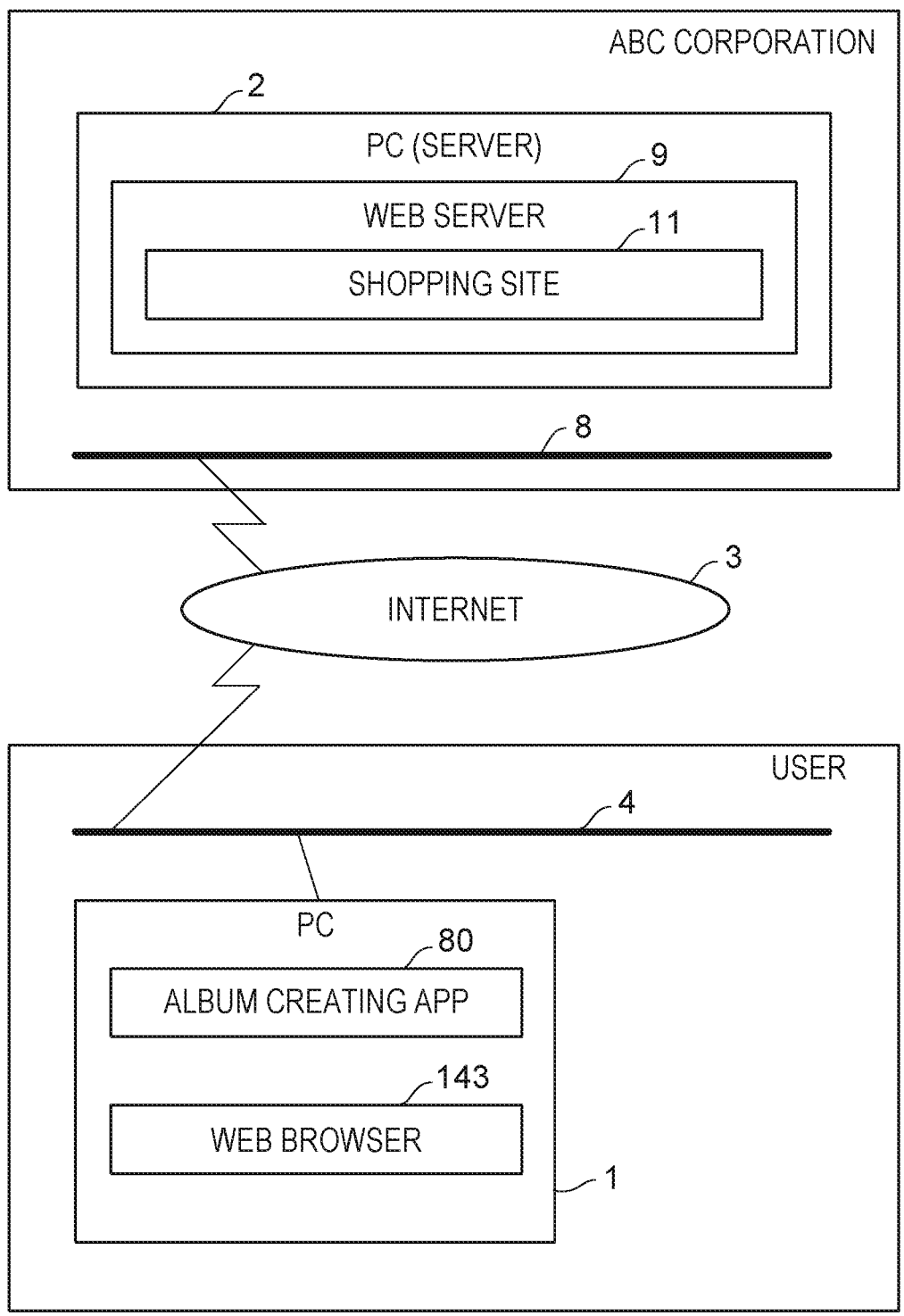
FIG. 1 illustrates a configuration of a system including an information processing apparatus.

FIG. 1 illustrates an example of a configuration of an information processing system for photo album creation/order. As illustrated in FIG. 1, the information processing system includes an information processing apparatus 1 used by a user and an information processing apparatus 2 used by a corporation which creates a photo album. The information processing apparatus 1 and the information processing apparatus 2 may be connected to each other via the internet 3. A personal computer is exemplified as the information processing apparatus 1, for example. The information processing apparatus 2 is a server personal computer (PC), for example. The information processing apparatus 1 and the information processing apparatus 2 may also be exemplified as various other configurations, such as a smartphone, tablet terminal, camera, printer, or the like. An operation system equivalent to Windows (registered trademark) 8, Windows (registered trademark) Server 2012, or the like, may be installed as an operating system (hereinafter, which will also be abbreviated to as an OS in some cases) into the information processing apparatus 1 and the information processing apparatus 2, for example. The information processing apparatus 1 and the information processing apparatus 2 may be respectively connected to networks 4 and 8 constituted by Ethernet (registered trademark) or the like.

An application 80 for creating a photo album (hereinafter, which will also be simply referred to as an app) may be installed into the information processing apparatus 1. The app may be constructed by a file in a Windows (registered trademark) executable format (*.EXE), for example. In addition, a Web browser application 143 (hereinafter, which will also be referred to as a Web browser) may be installed into the information processing apparatus 1. The Web browser 143 may be a browser used when World Wide Web (WWW) is used. The network 4 may be a network for the user to use the information processing apparatus 1 and may include, for example, a general household home network.

The information processing apparatus 2 may include a Web server 9 provided with a Web server function and provides, for example, a Web site of a predetermined company (ABC Corporation, in this example) via the internet 3. A shopping site 11 is a shopping site where a service may be provided for the user by ABC Corporation, and the user can order a photo album by using the shopping site 11.

Figure 2:
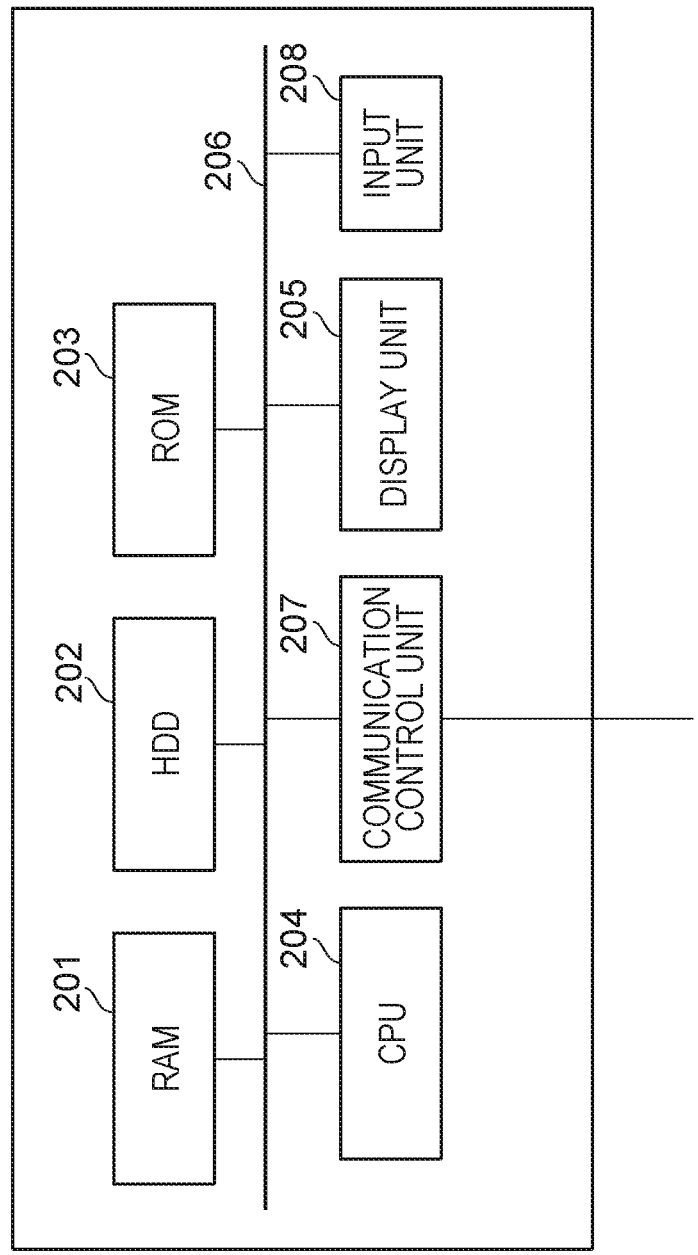
FIG. 2 illustrates a hardware configuration of the information processing apparatus.

FIG. 2 illustrates an example of a hardware configuration of the information processing apparatus 1. It should be noted that the information processing apparatus 2 may also have a similar configuration. However, the information processing apparatus 1 and the information processing apparatus 2 do not necessarily need to be constituted by the same configuration. As illustrated in FIG. 2, an information processing apparatus may include a central processing unit (CPU) 204, a random access memory (RAM) 201, a read-only memory (ROM) 203, a hard disc drive (HDD) 202, a display unit 205, an input unit 208, and a communication control unit 207, which may be connected to one another by a system bus 206.

The CPU (processor) 204, which may include one or more processors, one or more memories, circuitry, or a combination thereof, may be a system control unit and may be configured to control the entirety of the information processing apparatus 1. The CPU 204 may also execute a display control method which will be described according to the present exemplary embodiment in accordance with a program.

The RAM 201 may provide a memory for temporarily storing various information at the time of the execution of the program by the CPU 204. The ROM 203 may store the program execute by the CPU 204.

The HDD 202 may be a storage medium configured to store a database that holds a processing result such as an image file or an image analysis. The HDD 202 may store applications such as the album app 80 and the Web browser 143 and respective modules (software) which will be described with reference to FIG. 3. The applications and the respective modules may be read out by the RAM 201 to be executed by the CPU 204. With this configuration, the CPU 204 may realize functions of the applications such as the album app 80 and the Web browser 143 and the respective modules (software) illustrated in FIG. 3.

The display unit 205 displays a user interface (UI) according to the present exemplary embodiment or a layout result of the images to the user. The display unit 205 may be provided with a touch sensor function. The input unit 208 is used when the user performs various operations. For example, the input unit 208 is used to input predetermined information on the UI displayed on the display unit 205.

The communication control unit 207 is an apparatus configured to communicate with an external apparatus such as a printer or a server. For example, album data generated by the automatic layout is transmitted to the information processing apparatus 2 via the communication control unit 207.

Figure 3:
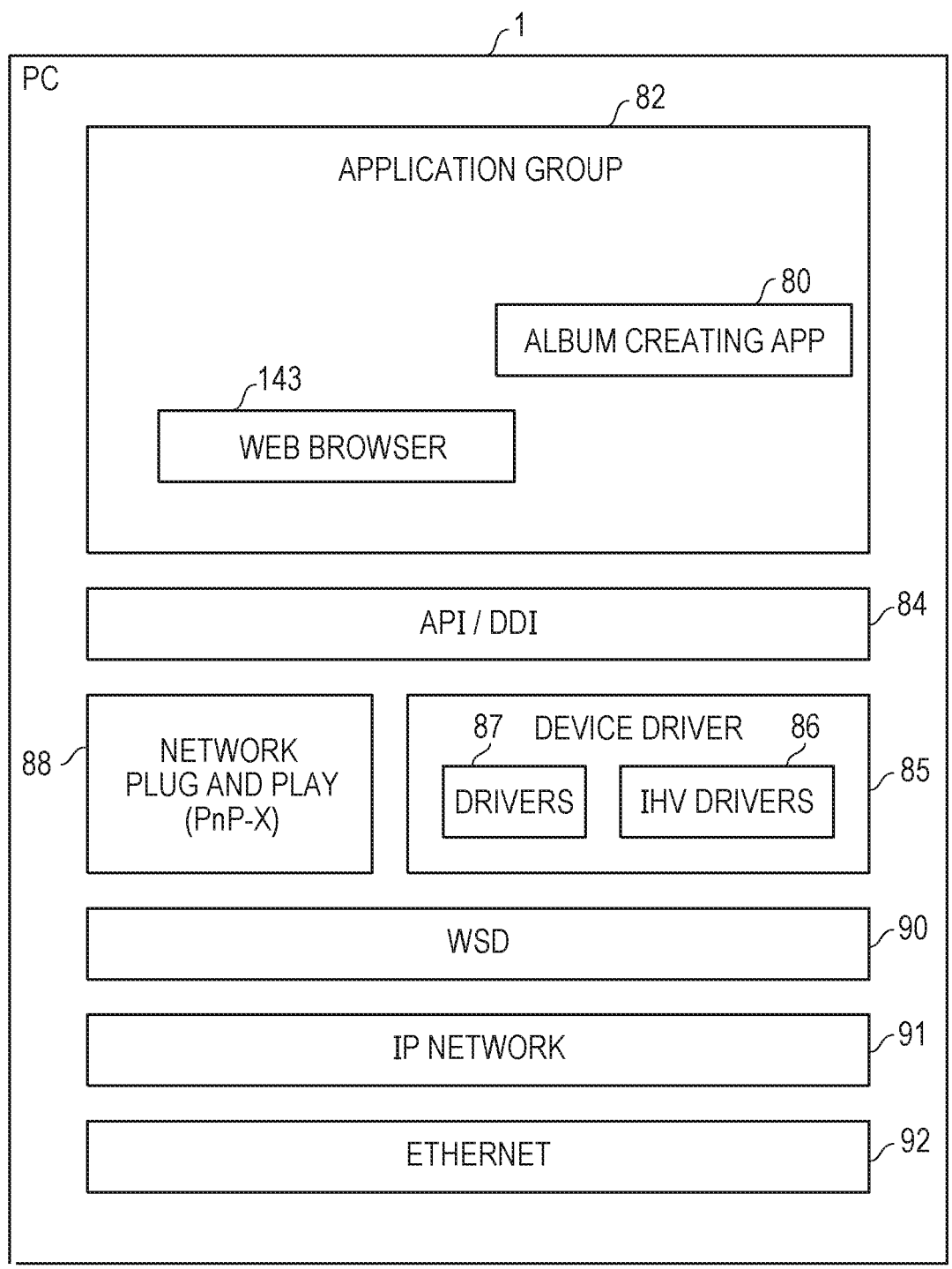
FIG. 3 illustrates a software configuration of the information processing apparatus.

FIG. 3 illustrates a configuration of a software module group saved in the HDD 202 of the information processing apparatus 1. The software modules illustrated in FIG. 3 represent part of the software module group saved in the HDD 202 and do not represent all of the software module group. In addition, the software module group saved in the HDD 202 is appropriately changed in accordance with the OS installed in the information processing apparatus 1, a use environment of the information processing apparatus 1, or the like.

A module 92 is an Ethernet control stack configured to control Ethernet. A module 91 is an IP network control stack configured to control an IP network. A module 90 is a WSD control stack configured to control Web Service on Devices (WSD) that provides a device search mechanism on the network. A module 88 is a PnP-X control stack configured to control Plug and Play on the network. It should be noted that PnP-X is an abbreviation of Plug and Play Extensions corresponding to a function installed as a standard into Windows8 (registered trademark) as a series of extended functions for Plug and Play which provides support with respect to a network connecting device. A module 85 is a device driver group and is constituted by including a standard driver group 87 packaged in the OS as a standard and an IHV driver group 86 provided from an independent hardware vendor (IHV).

A module 84 is an application/DDI interface and is constituted by including an application programing interface (API) and a device driver interface (DDI). An application group 82 is an application group including the app 80 and the Web browser 143.

Figure 4:
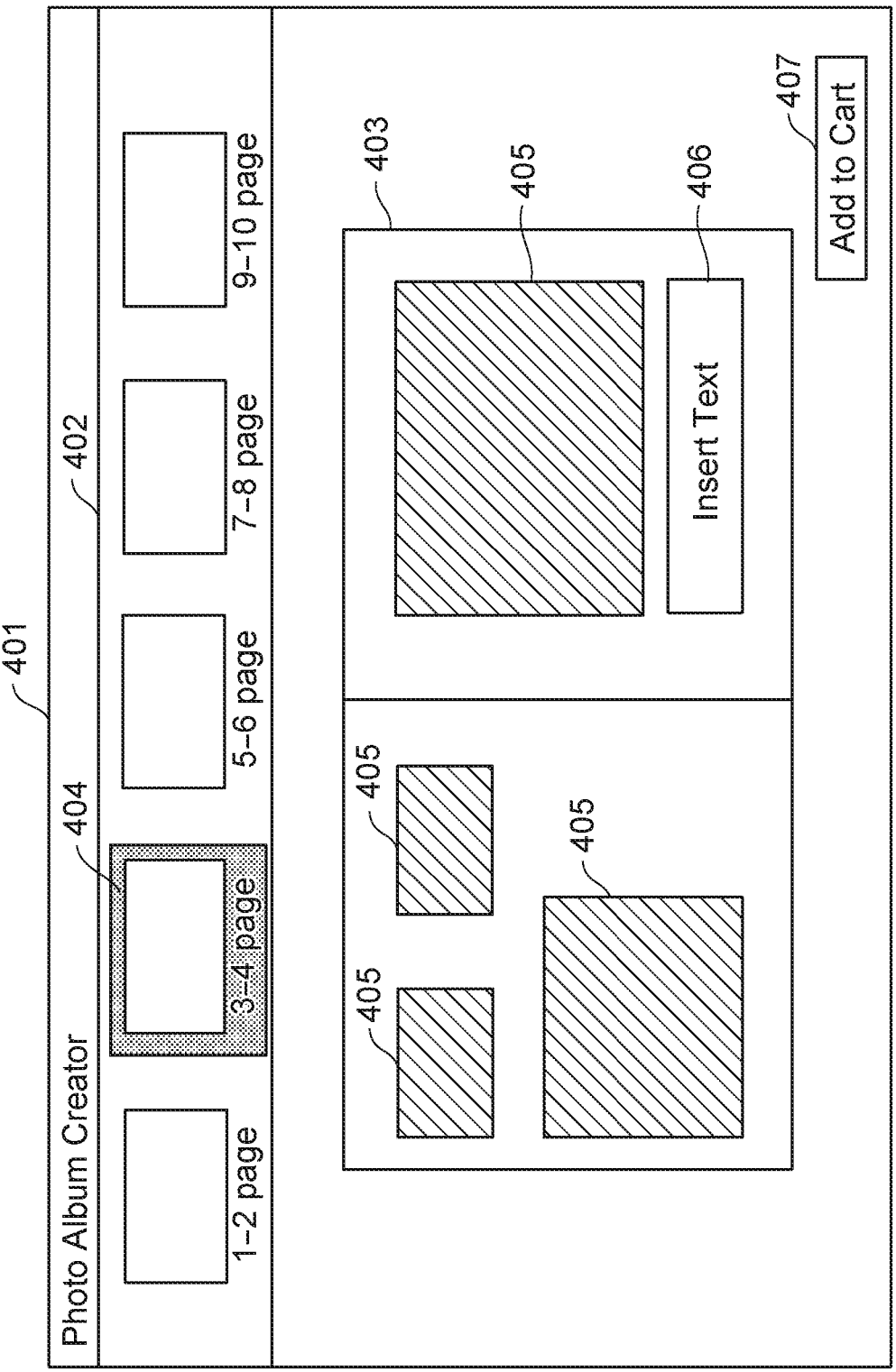
FIG. 4 is a schematic diagram illustrating a screen provided by an album creating application.

FIG. 4 illustrates a display screen provided by the CPU 204 when the photo album application is executed, and the display screen is an example of an editing screen for editing a photo album. An editing screen 401 is provided by the photo album application. A display area 402 is an area for displaying thumbnails of respective pages of the photo album in a list format. A display area 403 is an area for displaying a preview image of a page selected in the display area 402, and editing of a layout image can be performed in the display area 403.

When the user selects a desired thumbnail from among the thumbnails of the respective pages in the display area 402, the page turns to a display 404 in a selected state. In FIG. 4, two pages including pages 3 and 4 (one double-page spread) are in the selected state, and the layout image of these pages is displayed in the display area 403. It should be noted that the double-page spread is equivalent to a single display window in a display operation and is equivalent to a pair of pages adjacent to each other in a printing operation.

An editing operation of the photo album can be performed in the display area 403. A template displayed in the layout image has at least one slot. In FIG. 4, page 3 (left page in the drawing) has three slots 405, and page 4 (right page in the drawing) has one slot 405. A photo is allocated to each of the slots 405. It should be noted that, according to the present exemplary embodiment, a photo is automatically allocated to each of the slots 405. An arbitrary text is input to a text box 406 by the user.

A button 407 is a button for putting the photo album created (edited) by the application into a cart. When the button 407 is pressed, the edited photo album is uploaded onto a shopping cart of the information processing apparatus 2 via the internet 3.

Figure 5:
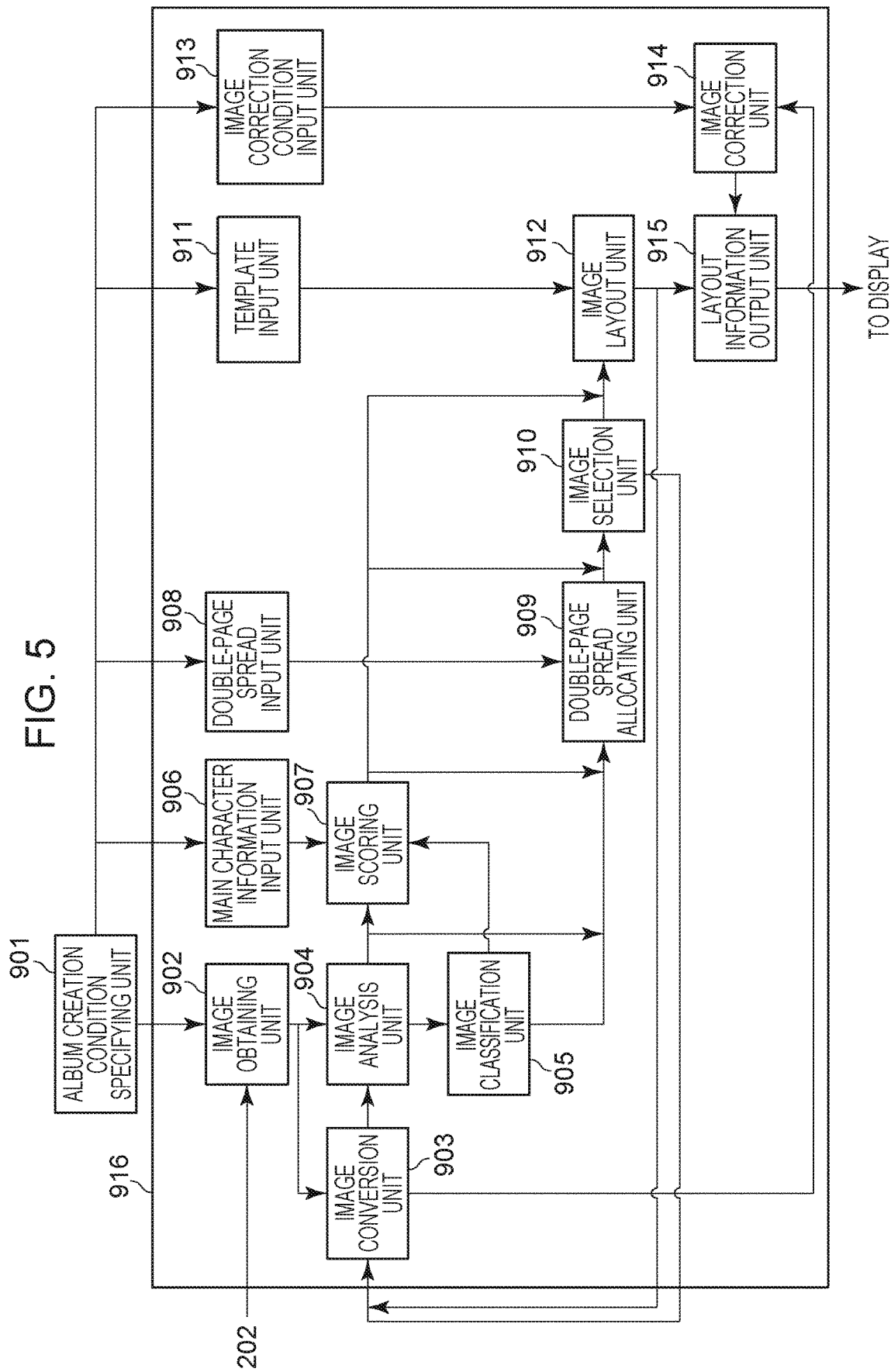
FIG. 5 illustrates an automatic layout processing unit of the album creating application.

FIG. 5 is a software block diagram of part of functions of an album creating application. Although the album creating application has various functions, according to the present exemplary embodiment, an automatic layout function provided by an automatic layout processing unit 916 will be described, in particular. The automatic layout function is a function for generating album images by classifying captured photos on the basis of their contents and attributes or selecting photos to be laid out and displayed on the display unit 205.

According to the present exemplary embodiment, the album creating application is activated when an icon of the application displayed on the display unit 205 is pressed by the user. As illustrated in FIG. 5, an album creating application includes an album creation condition specifying unit 901 and the automatic layout processing unit 916. An album creation condition is specified in the automatic layout processing unit 916 in accordance with a UI operation via the input unit 208 such as the mouse.

An image obtaining unit 902 obtains an image group specified by the album creation condition specifying unit from the HDD 202. The image group mentioned herein refers to a candidate image group where layout is performed when a single album is created. For example, in a case where January 1, year XX to December 31, year XX is specified in the album creation condition specifying unit 901, all images captured on January 1, year XX to December 31, year XX correspond to the specified image group.

An image conversion unit 903 converts the image data to be used in subsequent processes to have the desired number of pixels or color information. According to the present exemplary embodiment, the image conversion unit 903 converts the image data into an analysis image having the number of narrow side pixels and color information based on sRGB.

An image analysis unit 904 executes feature amount obtainment, face detection, expression recognition, and individual recognition which will be described below from the analysis image. The image analysis unit 904 also obtains data attached to the image obtained from the HDD 202 such as, for example, capturing date and time from Exif information.

An image classification unit 905 executes scene division and scene classification which will be described below by using capturing date and time information, the number of photos, and detected face information with respect to the image group. A scene refers to a capturing scene such as travel, daily life, or wedding. It can also be mentioned that the scene is a set of images captured on a capturing occasion for a certain period of time with regard to a certain capturing target, for example.

A main character information input unit 906 inputs identification information (ID) of a main character specified from the album creation condition specifying unit 901 to an image scoring unit.

An image scoring unit 907 performs scoring with respect to the respective images. According to the present exemplary embodiment, the scoring is performed in a manner that a high score is assigned to an image appropriate to the layout. The information obtained by the image analysis unit 904 and the information obtained by the image classification unit 905 are used when the scoring is performed in a manner that the high score is assigned to the image appropriate to the layout. The image scoring unit 907 performs the scoring with respect to the respective images in a manner that the score of the image including the main character ID input from the main character information input unit 906 becomes high.

A double-page spread allocating unit 909 divides the image group to be allocated to the respective pages in the double-page spread. The double-page spread mentioned herein is a double-page spread when an album is created, for example, and is equivalent to two pages.

A double-page spread input unit 908 inputs the number of double-page spreads of the album specified by the album creation condition specifying unit 901 to the double-page spread allocating unit 909.

The double-page spread allocating unit 909 divides the image group in accordance with the input number of double-page spreads and allocates part of the image group to each double-page spread. For example, in a case where the number of double-page spreads is 5, the obtained image group is divided into five parts to generate small image groups, and the single image group is allocated to each double-page spread.

An image selection unit 910 selects an image on the basis of the score assigned by the image scoring unit 907 from the part of the image group allocated to each double-page spread by the double-page spread allocating unit 909.

A template input unit 911 inputs a plurality of templates in accordance with template information specified from the album creation condition specifying unit 901 to an image layout unit 912.

The image layout unit 912 determines a layout of the images. Specifically, a template appropriate to the image selected by the image selection unit 910 is selected from among the respective templates input by the template input unit 911 to determine the layout (arrangement positions) of the respective images.

An image correction condition input unit 913 inputs ON/OFF conditions for the image correction which are specified by the album creation condition specifying unit 901 to an image correction unit 914.

The image correction unit 914 performs dodging correction, red-eye correction, and contrast correction. The image correction unit 914 performs the correction with respect to the image in the case of the image correction condition ON. The correction is not performed in the case of the image correction condition OFF. It should be noted that the image correction unit 914 executes the ON/OFF determination for the correction with respect to the image input from the image conversion unit 903. A configuration is adopted in which the number of pixels of the image to be input from the image conversion unit 903 to the image correction unit 914 can be changed in accordance with the size of the layout determined by the image layout unit 912.

A layout information output unit 915 outputs layout information for performing the display on the display unit in accordance with the image layout determined by the image layout unit 912. For example, the layout information is bitmap data in which the images selected in the template are laid out.

The units described throughout the present disclosure are exemplary and/or preferable modules for implementing processes described in the present disclosure. The term "unit", as used herein, may generally refer to firmware, software, hardware, or other component, such as circuitry or the like, or any combination thereof, that is used to effectuate a purpose. The modules can be hardware units (such as circuitry, firmware, a field programmable gate array, a digital signal processor, an application specific integrated circuit or the like) and/or software modules (such as a computer readable program or the like). The modules for implementing the various steps are not described exhaustively above. However, where there is a step of performing a certain process, there may be a corresponding functional module or unit (implemented by hardware and/or software) for implementing the same process. Technical solutions by all combinations of steps described and units corresponding to these steps are included in the present disclosure.

Flow of the Automatic Layout Processing

Figure 6:
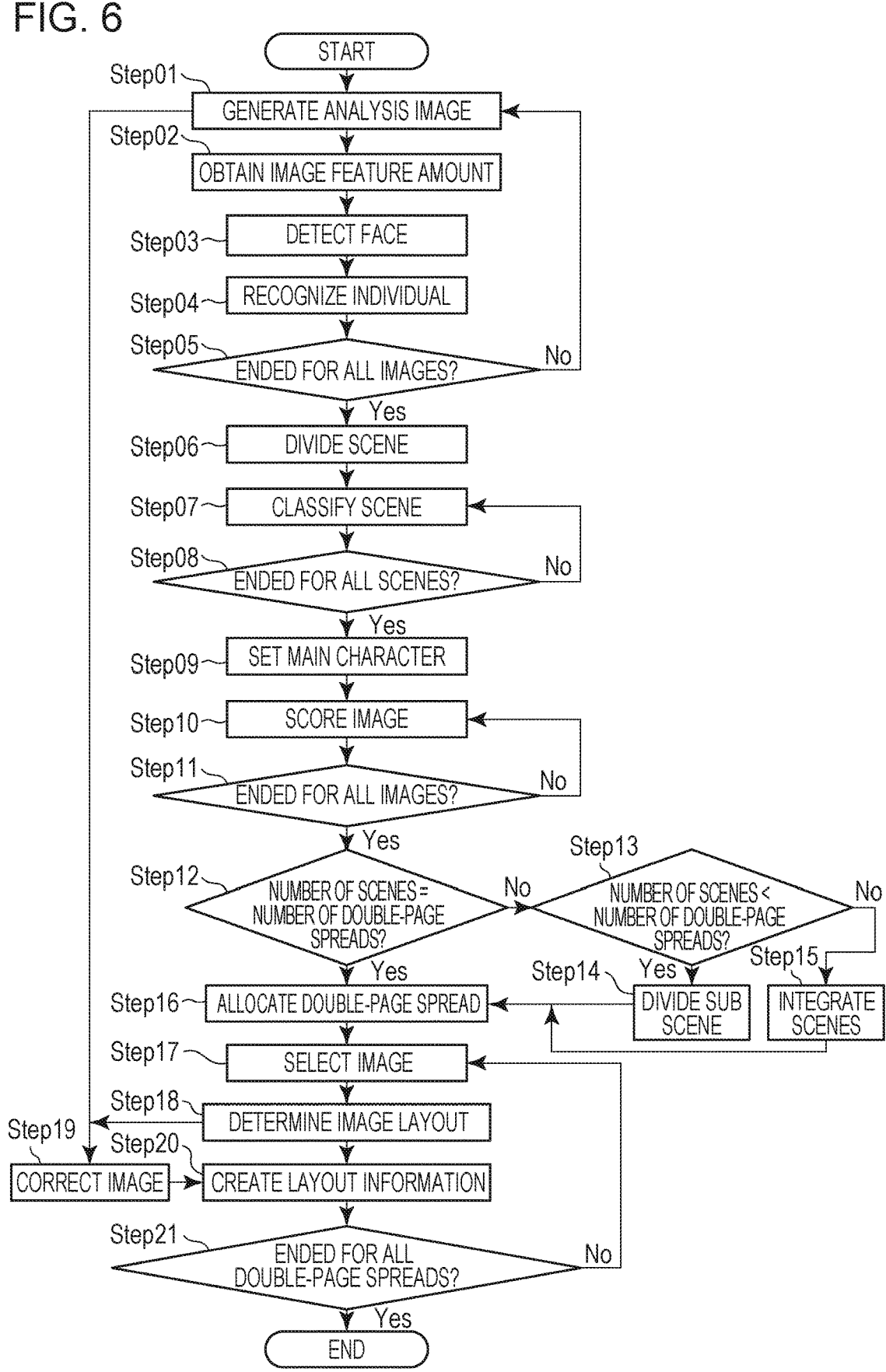
FIG. 6 is a flow chart illustrating a flow of automatic layout processing.

FIG. 6 is a flow chart illustrating a processing flow related to the automatic layout processing unit 916 of the album creating application according to the present exemplary embodiment. The flow chart illustrated in FIG. 6 is realized, for example, when the CPU 204 reads out the program stored in the HDD 202 into the ROM or the RAM 201 to be executed. The processing flow of the automatic layout will be described below with reference to FIG. 6.

In Step 01, the image conversion unit 903 generates the analysis image. The respective images in the image group of the HDD 202 specified by the album creation condition specifying unit 901 are converted into the desired number of pixels and color information. It should be noted that the number of pixels and color information subjected to the conversion herein are previously determined and saved. According to the present exemplary embodiment, the image is converted into the analysis image having the number of narrow side pixels and color information based on sRGB.

In Step 02, an image feature amount is obtained by the image analysis unit 904. For example, capturing date and time are obtained from the Exif information attached to the respective pieces of image data obtained from the HDD 202.

In addition, a feature amount is obtained from the analysis image generated in Step 01. The feature amount includes a focus, for example. A Sobel filter has been proposed as an edge detection method in general. When an edge is detected by the Sobel filter and a luminance difference between a start point and an end point of the edge is divided by a distance between the start point and the end point, it is possible to calculate an inclination of the edge. An average inclination of the edges in the image is calculated, and it is possible to consider that an image having a large average inclination is more in focus than an image having a small average inclination. When a plurality of thresholds having different values are set with respect to the inclination and the threshold to which the inclination is higher than or equal is determined, an in-focus degree can be calculated. According to the present exemplary embodiment, two different thresholds are set, and the in-focus degree is judged in three stages of ○, Δ, and ×. The inclination of the focus desired to be adopted in the album is set as ○. The inclination of the acceptable focus is Δ. The unacceptable inclination is set as ×. The thresholds are set through experiences.

In Step 03, the image analysis unit 904 executes face detection. A face is detected from the analysis image generated in Step 01. A method in related art can be used for the face detection. For example, Adaboost for creating a strong identifier from a plurality of prepared weak identifiers is exemplified. According to the present exemplary embodiment, a face of a person (object) is detected by the strong identifier created by Adaboost. A face image is extracted, and also upper left coordinate values and lower right coordinate values of the detected face position are obtained. It should be noted that the "image" mentioned herein refers to an image represented by the image data generated in Step 01. When the coordinates of these two types are identified, it is possible to identify the position of the human face and the size of the face. It should be noted that the human face is detected herein, but the configuration is not limited to the human face. An object such as an animal like a dog or a cat, a flower, food, a building, or an ornament can be set as a detection target instead of the face, and the strong identifier can be created by Adaboost. That is, an object other than the face may be detected.

In Step 04, the image analysis unit 904 performs individual recognition. First, the face image extracted in Step 03 is compared with a representative face image saved in a face dictionary database for each individual ID in terms of similarity. An ID having the similarity higher than or equal to a threshold and the highest similarity is set as an ID of the extracted face image. It should be noted that, in a case where the similarity is lower than the threshold, a new face is set, and the extracted face image is registered in the face dictionary database as a new individual ID.

Image analysis information obtained in Step 02 to Step 04 is stored while distinguishing the IDs for identifying the respective images from each other as illustrated in FIG. 7. The capturing date and time information and the focus judgement result obtained in Step 02 and the number and position information of the faces detected in Step 03 are saved. It should be noted that the position information of the faces is distinguished and stored for each individual ID obtained in Step 04. In a case where a face is not detected in the image data, the capturing date and time information and the focus judgement result obtained in Step 02 are saved.

In Step 05, it is determined whether or not Step 01 to Step 04 are ended for all the images in the image group in the HDD 202 specified by the album creation condition specifying unit 901. In a case where Step 01 to Step 04 are not ended for all the images (Step 05: No), the flow returns to Step 01. In a case where Step 01 to Step 04 are ended for all the images (Step 05: Yes), the flow shifts to Step 06.

Figure 8A:
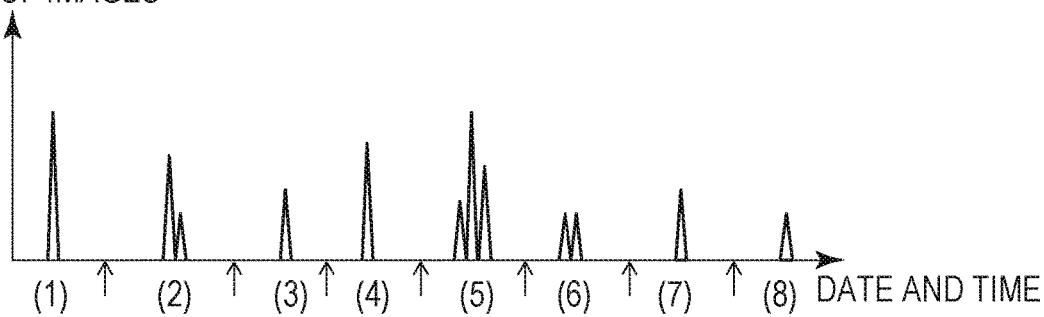
FIGS. 8A to 8C are explanatory diagrams for describing image group division in the automatic layout processing.

In Step 06, the image classification unit 905 performs scene division. The scene division refers to division of the obtained image group into a plurality of sub image groups in accordance with a scene. Specifically, the image group is divided into a plurality of groups depending on a time difference between one image and another image on the basis of the capturing date and time information already obtained in Step 02. In a case where capturing dates for one image and another image are not continuous, that is, a case where a date when capturing has not been performed exists between the images, the division is performed. Next, a case where the capturing dates are continuous will be described. According to the present exemplary embodiment, the division is performed in a case where the time difference between one image and another image when the capturing has not been performed is 16 hours or longer. In a case where the time difference between one image and another image is shorter than 16 hours, if a time difference between the first capturing and the last capturing on the respective continuous dates is shorter than 4 hours, the division is performed. According to the present exemplary embodiment, in a case where the above-described time difference is 4 hours or longer, if the number of captured images on the respective continuous dates is lower than 50, the division is performed. If the number of captured images is higher than or equal to 50, the division is not performed. It should be noted that the threshold for the time difference and the threshold for the number of photos at the time of the division are not limited to the above. FIG. 8A illustrates a result of the division based on the above-described scene division method.

In Step 07, the image classification unit 905 performs scene classification. According to the present exemplary embodiment, a case will be described as an example where the respective sub image groups (respective scenes) is classified into three categories including travel, daily life, and ceremony, but the classification is not limited to the above. First, a plurality of sub image groups where a classification into one of the travel, the daily life, and the ceremony is previously determined are obtained. Capturing feature amounts are obtained with regard to the respective image groups. The feature amounts according to the present exemplary embodiment include, for example, a capturing period, the number of captured images, and the number of captured people. The capturing period is a time difference from the first capturing until the last capturing in the image group. The number of captured images is the number of images included in the sub image group (number of photos). The number of captured people is the number of faces in the images where faces are depicted. That is, the number of captured people is the number of faces included in the single image. Average values and a standard deviation of the capturing periods, average values and a standard deviation of the numbers of captured images, and average values and a standard deviation of the numbers of people per image are obtained with respect to the plurality of sub image groups. It should be noted that, according to the present exemplary embodiment, the number of faces per image is set as the number of people per image. FIG. 9 illustrates the respective average values and standard deviations of the capturing period (hours), the number of captured images (photos), and the number of captured people (individuals). These obtained values are previously embedded in the program of the album creating application. After the album creating application is activated, the image classification unit 905 calculates the average values of the capturing periods, the numbers of captured images, and the numbers of captured people with respect to the respective divisions after the scene division is performed in Step 06 in the image group specified by a path box 302. Then, scoring is executed for each scene by the following expressions on the basis of the respective average values and standard deviations with respect to the feature amount of the capturing period, the number of captured images, and the number of captured people in the respective sub image groups.

Score=50−|10×(average value−feature amount)/standard deviation| (1)

Average score=(scoring for the capturing period+scoring for the number of captured images+scoring for the number of people)/the number of feature amount items (2)

Thus, the average scoring for each of the travel, the daily life, and the ceremony is calculated. The classification is performed while a scene having the highest score for each sub image group is set as the scene for the sub image group. In a case where two or more scenes have the same score, the scenes are classified as priority scenes. For example, according to the present exemplary embodiment, an order of daily life>ceremony>travel is set, and the priority of the daily life is set as the highest.

With regard to the sub image group (5) after the scene division of FIG. 8A is performed, the capturing period is 36 hours, the number of captured images is 300, and the number of captured people is 1.7. The average score of the travel is 45.32. The average score of the daily life is 18.38. The average score of the ceremony is −29.92. Therefore, the scene is classified as the travel. The classified scenes are managed by scene IDs such that the scenes can be identified.

In Step 08, it is determined whether or not the scene classification in Step 07 is ended with respect to all the sub groups after the division is performed in Step 06. In a case where the scene classification is not ended (Step 08: No), the flow returns to Step 07. In a case where the scene classification is ended (Step 08: Yes), the flow shifts to Step 09.

In Step 09, the image scoring unit 907 performs main character setting. The main character setting is executed with respect to the image group specified by the user, and two types including automatic and manual settings are prepared. In a case where the main character is automatically set, the setting is performed on the basis of a result of the individual recognition in Step 04 and a result of the scene division in Step 06. The numbers of times of the respective individual IDs appearing in the sub image group, the numbers of times of the respective individual IDs appearing in the respective scenes, the numbers of scenes where the respective individual IDs appear, and the like are identified from the result obtained in Step 04, and a main character is automatically set from these pieces of information. According to the present exemplary embodiment, in a case where the sub image group includes a plurality of scenes, the individual ID appearing in the plurality of scenes is set as a main character ID. In a case where the sub image group is a single scene, the individual ID in the single scene having the high number of appearances in the single scene is set as the main character ID. In a case where the user specifies a particular icon by a main character setting unit 304, the individual ID corresponding to an icon selected via a main character information input unit is transmitted to the image scoring unit 907. In a case where the individual ID specified by the user exists, the above-described automatically set main character ID is ignored, and the individual ID specified by the user is set as the main character ID. In this manner, the setting based on the specification by the main character setting unit 304 is regarded as the manual setting.

In Step 10, the image scoring unit 907 performs scoring. The scoring refers to a value to which a reference is made when the image is selected which will be described below, and a score is assigned after an evaluation for each image data is performed from the following viewpoints.

Figure 12A:
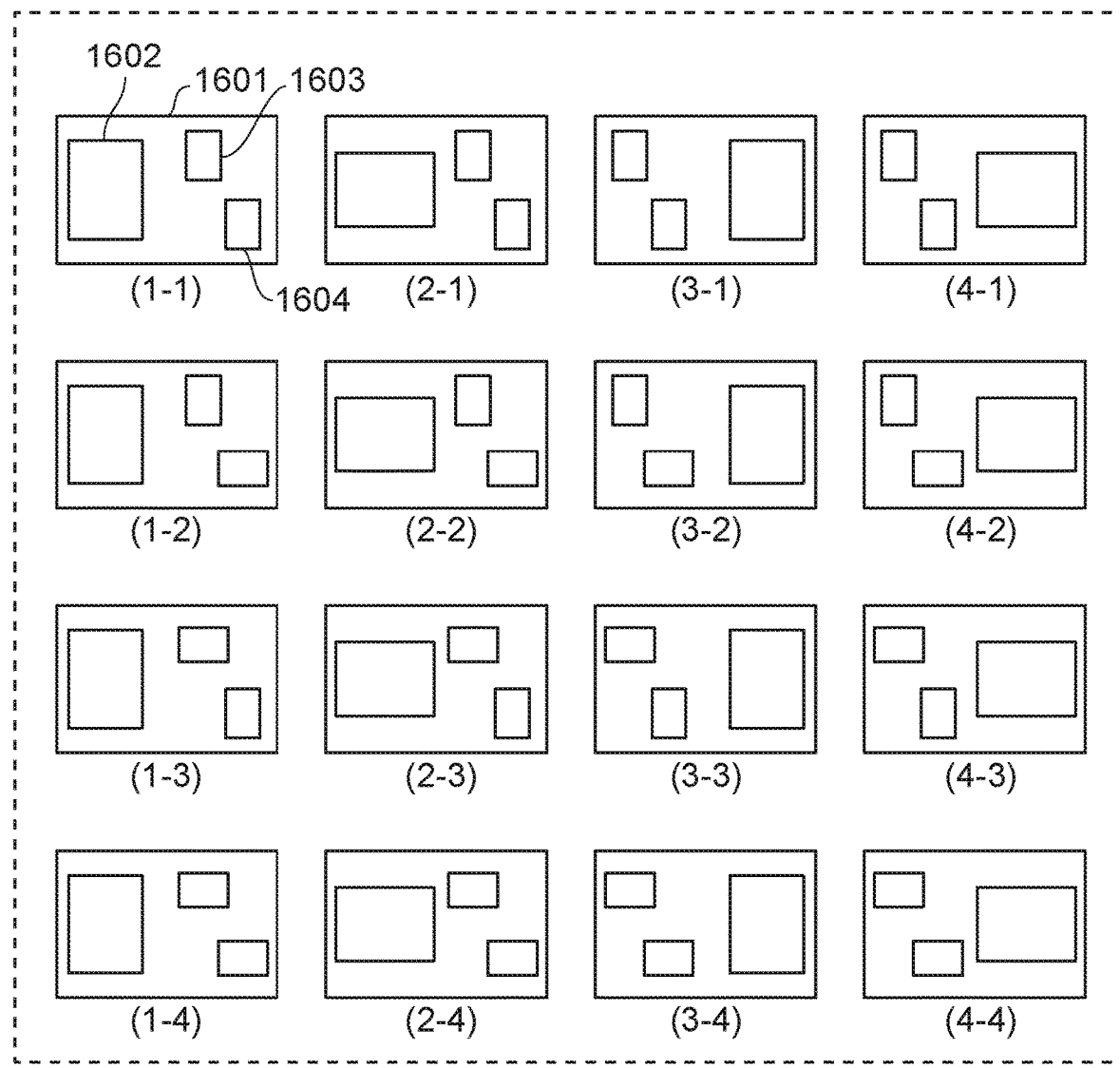
FIGS. 12A and 12B are explanatory diagrams for describing an image layout in the automatic layout processing.
Figure 12B:
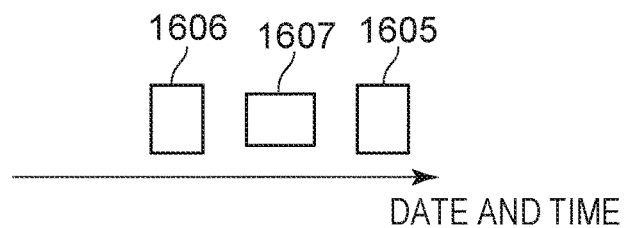

FIGS. 12A and 12B illustrate a template group used when three images are to be laid out. A template 1601 illustrated in (1-1) in FIG. 12A is a single template and includes a main slot 1602, a sub slot 1603, and a sub slot 1604. The main slot 1602 is a slot serving as a main component (frame for laying out the image) for the template 1601 and has a size larger than the sub slot 1603 and the sub slot 1604. The sub slot is a slot other than the main slot in each of the templates. Both a score for the main slot and a score for the sub slot are assigned to each of the image data. In scoring processing, both the score for the main slot and the score for the sub slot are assigned to each image.

Next, FIG. 10A illustrates scoring criteria for the image data. FIG. 10A is a table in which features of images having higher scores for each of the scenes including the travel, the daily life, and the ceremony are separately summarized for the main slot and the sub slot. It should be noted that, as illustrated in FIG. 10A, the features having high scores in accordance with the type of the slot vary. For example, in a case where the scene classification of the sub image group is the travel, a zoomed-out image including a person and a landscape has a high score as the main slot, and a close-up face or side face image has a high score as the sub slot. For example, in a case where the scene classification of the sub image group is the daily life, a close-up face or side face image has a high score as the main slot, and a zoomed-out image including a person and a landscape has a high score as the sub slot. For example, in a case where the scene classification of the sub image group is the ceremony, an image in which a distance between two people is short has a high score as the main slot, and an image including many people has a high score as the sub slot. In this manner, features for high scores in accordance with the scene and the type of the slot, in other words, evaluation criteria vary. According to the present exemplary embodiment, the feature in which the score in accordance with the scene and the type of the slot becomes high is previously set in the application to be included in the program. It should be noted that the feature for the high score is not limited to the above. The scores are assigned to the respective pieces of image data included in the respective sub image groups on the basis of the respective features of the main slots and the sub slots in the respective scenes illustrated in FIG. 10A. The numbers of faces in the respective images, the positions of the faces in the respective images, and the sizes of the faces in the respective images are obtained, and the average values and the standard deviations are obtained with respect to the respective scenes and the respective types of the slots (the main slot and the sub slot) to be stored in the program of the album creating application. Any one of the scenes to which the images represented by the respective pieces of image data in the image group specified by the user belong (are classified) is identified from the result of the scene classification in Step 07. The score and the average score are calculated by the following expressions on the basis of the previously obtained average values and standard deviations corresponding to the scenes of an image of interest and the respective feature amounts including the number of faces of the main character ID, the positions of the faces, and the face sizes in the image of interest.

Score=50−|10×(average value−feature amount)/standard deviation|

Average score=(score of the number of faces+score of the face positions+score of the face sizes)/the number of feature amount items It should be noted that the scoring is performed for both the main slot and the sub slot. With regard to the images to be used in the album, a score may also be added to the image having the image ID in which the feature amount of focus illustrated in FIG. 7 is ◯. With this configuration, the score of the in-focus image can be increased. FIG. 10B illustrates an example of scoring results of the respective images, and scores of the main slot and the sub slot are assigned with respect to the respective image IDs.

In Step 11, it is determined whether or not the image scoring unit 907 ends the image scoring in Step 10 with respect to all the images in the image group specified by the user. In a case where the image scoring is not ended (Step 11: No), the flow returns to Step 10. In a case where the image scoring is ended (Step 11: Yes), the flow shifts to Step 12.

In Step 12, the double-page spread allocating unit 909 determines whether or not the number of scenes obtained by the scene division by the image classification unit 905 (the number of sub image groups) is the same as the number of double-page spreads input by the double-page spread input unit 908. In a case where the numbers are not the same (Step 12: No), the flow shifts to Step 13. In a case where the numbers are the same (Step 12: Yes), the flow shifts to Step 16. For example, when the number of scene divisions of FIG. 10A is 8 and the input number of the double-page spread input unit 908 is 8, the flow shifts to Step 16.

In Step 13, the double-page spread allocating unit 909 determines whether or not the number of scenes obtained by the scene division by the image classification unit 905 is lower than the number of double-page spreads input by the double-page spread input unit 908. In a case where the number of scenes is not lower than the number of double-page spreads (Step 13: No), the flow shifts to Step 15. In a case where the number of scenes is lower than the number of double-page spreads (Step 13: Yes), the flow shifts to Step 14. For example, when the number of scene divisions of FIG. 8A is 8 and the input number of the double-page spread input unit 908 is 10, the number of scenes is lower than the number of double-page spreads, the flow shifts to Step 14.

Figure 8B:
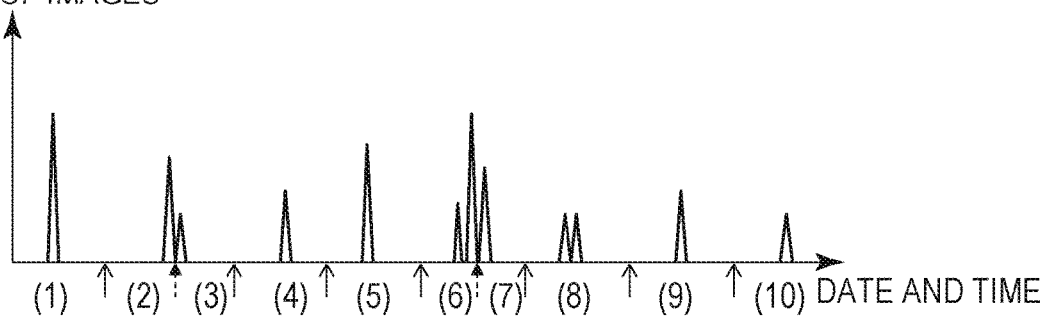

In Step 14, the double-page spread allocating unit 909 performs sub scene division. The sub scene division refers to a state in which the divided scene is further divided into smaller parts in a case where a relationship of the number of scene divisions<the number of double-page spreads is established. A case where the number of specified double-page spreads is 10 while the number of scene divisions is 8 in FIG. 8A will be described as an example. FIG. 8B illustrates a result of the sub scene division on FIG. 8A. The number of divisions is set as 10 when the sub image group is further divided at positions indicated by broken line arrows. Criteria for performing the sub scene division are the number of images and the capturing date and time. The sub image group where the number of images is high is identified in the divisions of FIG. 8A. Herein, to increase the number of scenes by 2 from 8 to 10, the two sub image groups where the number of images is high are identified. The sub image group where the number of images is the highest is the sub image group (5), and then the sub image groups where the number of images is the second highest are the sub image group (1) and the sub image group (2).

According to the present exemplary embodiment, in a case where the numbers of images included in the sub image groups are the same, the sub image group where a time difference between the first image and the last image included in the sub image group is large is divided. The numbers of images included in the sub image group (1) and the sub image group (2) are the same. Since the sub image group (2) has the larger time difference between the first image and the last image than that of the sub image group (1), the sub image group (2) is set as a division target. That is, in FIG. 8B, the sub image group (5) and the sub image group (2) are respectively further divided.

First, a division method for the sub image group (2) will be described. The sub image group (2) has two crests in terms of the number of images, and the capturing dates corresponding to these two crests are different from each other. In this case, the division is performed at a position where the capturing date changes (position indicated by the broken line arrow in FIG. 8B).

Next, the division of the sub image group (5) will be described. The sub image group (5) has three crests in terms of the number of images, and the capturing dates corresponding to these three crests are different from one another. In this case too, the division is performed at positions where the capturing date changes. At this time, two positions where the capturing date changes exist, and the division is performed in a manner that a difference in the numbers of images in the respective image groups after the division becomes small. In FIG. 8B, the difference in the numbers of images in the respective image groups after the division becomes smaller when the division is performed at a boundary between the second day and the third day as compared with a case where the division is performed at a boundary between the first day and the second day in the sub image group (5). Therefore, the division is performed at the boundary between the second day and the third day. That is, the division is performed at a position indicated by the broken line arrow in FIG. 8B. With the above-described processes, the number of divisions is changed from 8 to 10. Herein, the division is performed at the position where the dates vary. However, in a case where the sub image group where the number of images is high corresponds to the capturing on a single day, the division is performed at a position where a time difference is the largest within the single day.

Figure 8C:
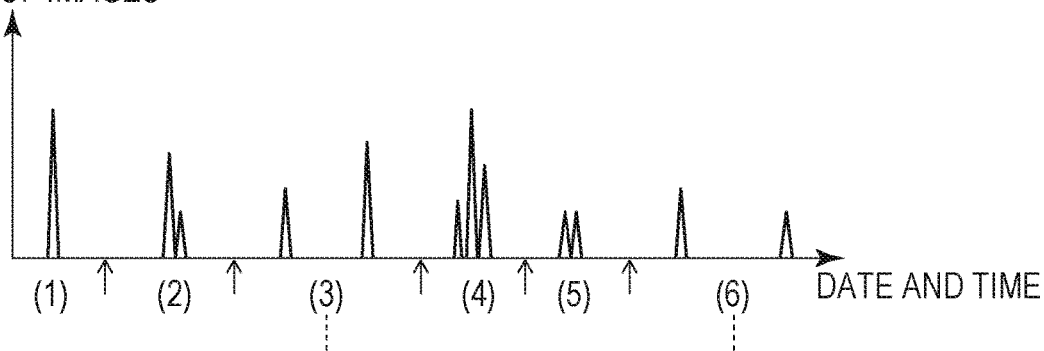

In Step 15, the double-page spread allocating unit 909 performs scene integration. The scene integration refers to an integration of the divided scenes (sub image groups) in a case where the number of scenes is higher than the number of double-page spreads. Specifically, the scene integration is performed such that the number of scenes is matched with the number of double-page spreads. FIG. 8C illustrates a result of the scene integration on FIG. 8A to set the number of scenes as 6 in a case where the number of double-page spreads is 6. While the integration of the parts at the broken lines is performed, in other words, when the division of the parts at the broken lines is not performed, the number of scenes (the number of sub image groups) is set as 6. In the scene integration, the sub image group where the number of images is low is identified. Herein, to decrease the number of divisions by 2 from 8 to 6, the sub image group where the number of images is low is identified.

The sub image group where the number of images is the lowest is the sub image group (8), and the sub image groups where the number of images is the second lowest are the sub image group (3) and the sub image group (7). Therefore, first, the sub image group (8) is set as an integration target. Next, the number of images in the sub image group (3) is the same as that in the sub image group (7). It should be noted however that the sub image group (8) adjacent to the sub image group (7) is the integration target, and therefore the sub image group (3) is set as the integration target. Next, it is determined whether the sub image group of the integration target is integrated with the sub image group where the capturing date and time are earlier or the sub image group where the capturing date and time are later. First, the integration of the sub image group (3) will be described. A time difference in the sub image group (2) which is earlier than the sub image group (3) and a time difference in the sub image group (4) which is later than the sub image group (3) are compared with each other, a difference between the capturing times of the last image in the sub image group (3) and the first image in the sub image group (4) is smaller than a difference between the capturing times of the first image in the sub image group (3) and the last image in the sub image group (2). Therefore, it is determined that the sub image group (3) is to be integrated with the sub image group (4). That is, the integration is performed at a broken line position under sub image group (3) in FIG. 8C. Next, the integration of the sub image group (8) will be described. Since the sub image group (8) does not have a subsequent sub image group, the sub image group (8) is integrated with the earlier sub image group (7). That is, the integration is performed at a broken line position under sub image group (6) in FIG. 8C FIG. 11C. It should be noted that, according to the present exemplary embodiment, the sub image groups where the difference between the capturing times is small are integrated with each other, but the configuration is not limited to the above. For example, the sub image group of the integration target may be integrated with the sub image group where the number of captured images is low.

In Step 16, the double-page spread allocating unit 909 performs double-page spread allocation. In Step 12 to Step 15, the number of sub image groups is the same as the number of specified double-page spreads. According to the present exemplary embodiment, the initial sub image group in terms of the capturing date and time is allocated to the beginning of the double-page spread. That is, the sub image groups are allocated to the pages of the respective double-page spreads in the album in the order of the capturing date and time. With this configuration, it is possible to create the album in which the sub image groups are arranged in the order of the capturing date and time. It should be noted that the images do not necessarily need to be arranged in the order of the capturing date and time within the pages corresponding to the single double-page spread as will be described below.

Figure 11A:
FIGS. 11A to 11I are explanatory diagrams for describing image selection in the automatic layout processing.
Figure 11B:
Figure 11C:
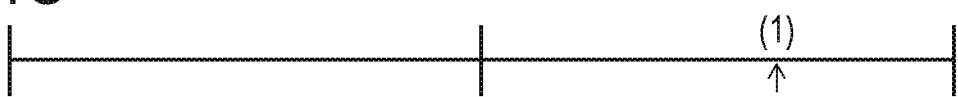
Figure 11D:
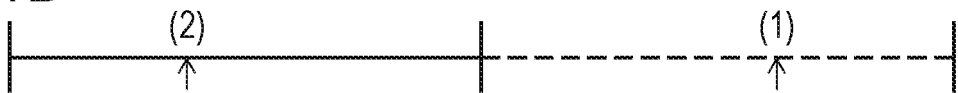
Figure 11E:
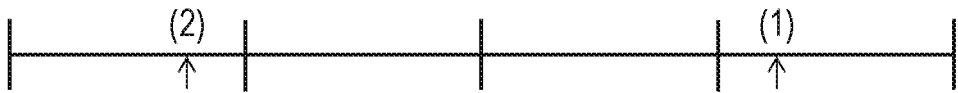
Figure 11F:
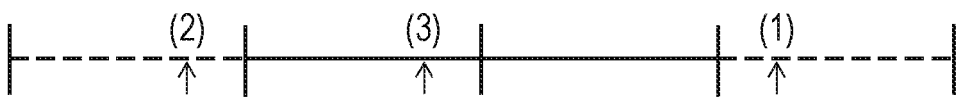
Figure 11G:
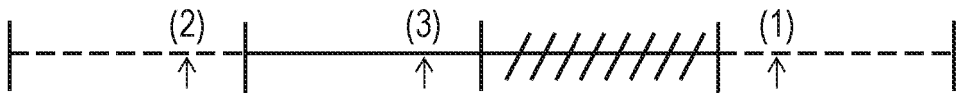
Figure 11H:
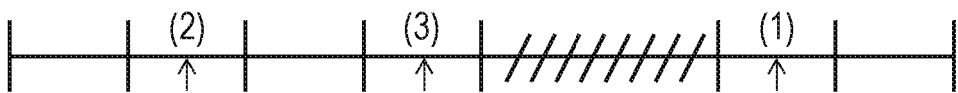
Figure 11I:
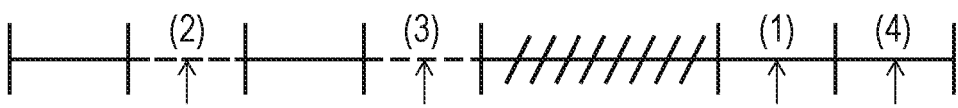

In Step 17, the image selection unit 910 selects a predetermined number of images from the respective sub image groups. A case where four images are selected from the sub image group allocated to a certain double-page spread will be described as an example with reference to FIGS. 11A to 11I. It should be noted that, herein, the double-page spread refers to two pages, and the first double-page spread and the last double-page spread refer to one page each. FIG. 11A illustrates the time difference in the capturing date and time from the first image until the last image in the sub image group allocated to the double-page spread, in other words, the capturing period for the sub image group. A method of selecting a first image when four images are to be selected will be described with reference to FIG. 11B. A single main slot exists in a template. The image for the main slot is selected as the first image. An image having the highest points as the score for the main slot which is assigned in Step 10 is selected from among all the images captured during the capturing period for the sub image group illustrated in FIG. 11B. Then, the images for the sub slot are selected as the second and subsequent images. According to the present exemplary embodiment, the capturing period for the sub image group is segmented to select images so that no concentration occurs in part of the capturing period for the sub image group. First, as illustrated in FIG. 11C, the capturing period for the sub image group is divided into two equal parts to set two capturing periods. That is, the sub division capturing period is divided into two equal parts to set the two capturing periods (grouping). Next, as illustrated in FIG. 11D, the image having the highest score for the sub slot is selected as the second image from the capturing period (solid line interval) in which the first image is not selected. Next, as illustrated in FIG. 11E, each of the capturing periods in FIG. 11D are respectively divided into two equal parts. The image having the highest score for the sub slot among the images captured in solid line intervals in FIG. 11F, that is, during the two capturing periods in which the first image and the second images are not selected (images corresponding to the two capturing periods) is selected as the third image. Next, an example in which an image does not exist during the capturing period for selecting an image, and image selection is not performed will be described for the selection of the fourth image as an example. According to the present exemplary embodiment, irrespective of the number of images, the capturing period is divided in accordance with time. Therefore, an image may not exist during the capturing period obtained by the division in some cases. For example, as illustrated in FIG. 11G, the fourth image is desired to be selected from the capturing period (shaded interval) in which an image is not yet selected, but no image exists in this shaded interval. In this case, as illustrated in FIG. 11H, each of the capturing periods in which the images have been already selected is divided into two parts. Next, as illustrated in FIG. 11I, an image having the highest score for the sub slot among the images captured during the solid lines capturing period in which the first to third images are not selected is selected as the fourth image.

In Step 18, the image layout unit 912 determines the image layout for the double-page spread of the processing target. A case where the template input unit 911 inputs (1-1) to (4-4) in FIG. 12A to a certain double-page spread in accordance with the specified template information will be described as an example. The number of slots in the input template is 3. Whether image orientations of the three selected images are a vertical direction (portrait) or a horizontal direction (landscape) are arranged in the order of the capturing dates and times, and it is assumed that FIG. 12B is obtained. Herein, an image 1605 is a selected image for the main slot, and an image 1606 and an image 1607 are selected images for the sub slot. According to the present exemplary embodiment, it is set that an image having order capturing date and time is laid out in an upper left of the template, and an image having newer capturing date and time is laid out in a lower right of the template. Since the image 1605 has the newest capturing date and time and also corresponds to the image for the main slot, the templates of (3-1) to (3-4) in FIG. 12A are set as candidates. Then, the order image 1606 for the sub slot, that is, the image desired to be arranged in the upper left is the vertical image, and the newer image 1607 is the horizontal image. Therefore, the layout is determined while (3-2) in FIG. 12A is set as the template most appropriate to the selected image. In this manner, in Step 18, the template used for the layout and the information are determined with which it is possible to identify which image is to be laid out in which slot of the template. In FIGS. 12A and 12B, the case where the number of slots is 3 has been described as an example. In a case where the number of images to be used becomes 4 in Step 17, template sets for the number of slots of 4 are prepared, and similarly, coincidence degrees for the slot states and the image states are determined with respect to those template sets. With this configuration, a template may be determined in which images are to be laid out.

In Step 19, the image correction unit 914 performs the image correction. In a case where the image correction condition input unit inputs ON, the image correction is executed. According to the present exemplary embodiment, the dodging correction, the red-eye correction, and the contrast correction are automatically executed as the image correction. In a case where the image correction condition input unit inputs OFF, the image correction is not executed. The number of pixels of the image to be corrected is the short side 1200 pixels, and the image correction ON/OFF is executed with respect to the image converted into the color space based on sRGB.

In Step 20, the layout information output unit 915 creates layout information. The respective images are laid out as determined in Step 18. At this time, magnifications of the images to be laid out are changed to perform the layout in accordance with size information of the respective slots included in the template. Then, bitmap data in which the images are laid out in the template is generated.

In Step 21, it is determined whether or not Step 17 to Step 20 are ended with respect to all the double-page spreads. In a case where Step 17 to Step 20 are not ended (Step 21: No), the flow returns to Step 17. In a case where Step 17 to Step 20 are ended (Step 21: Yes), the automatic layout processing is ended.

Editing of the Photo Album

Next, an operation for editing the laid-out photo album will be described. An example in which a photo set a photo in a slot on a certain page is swapped with a photo in an available slot on another page will be described herein. According to the present exemplary embodiment, an example of a display control in a case where the photo (image) after the layout is regarded as a display item, and the item is moved on the basis of the user operation will be described. It should be noted that the following processing is realized when the CPU 204 reads out the program stored in the HDD 202 onto the ROM or the RAM 201 to be executed.

FIGS. 13A to 13F illustrate a state of full-screen display of the editing screen 401 for the photo album in a display area of a terminal apparatus 1301 (such as a smart phone or a tablet terminal) corresponding to the information processing apparatus 1. The terminal apparatus 1301 is provided with a home button 1302. FIGS. 13A to 13F illustrate a procedure in a case where a photo a1 of a double-page spread A is swapped with a photo b3 of a double-page spread B. In addition, a next page turning area 1304 and a previous page turning area 1303 are provided in the editing screen as a page change area for changing the page displayed in the display area.

Figure 13A:
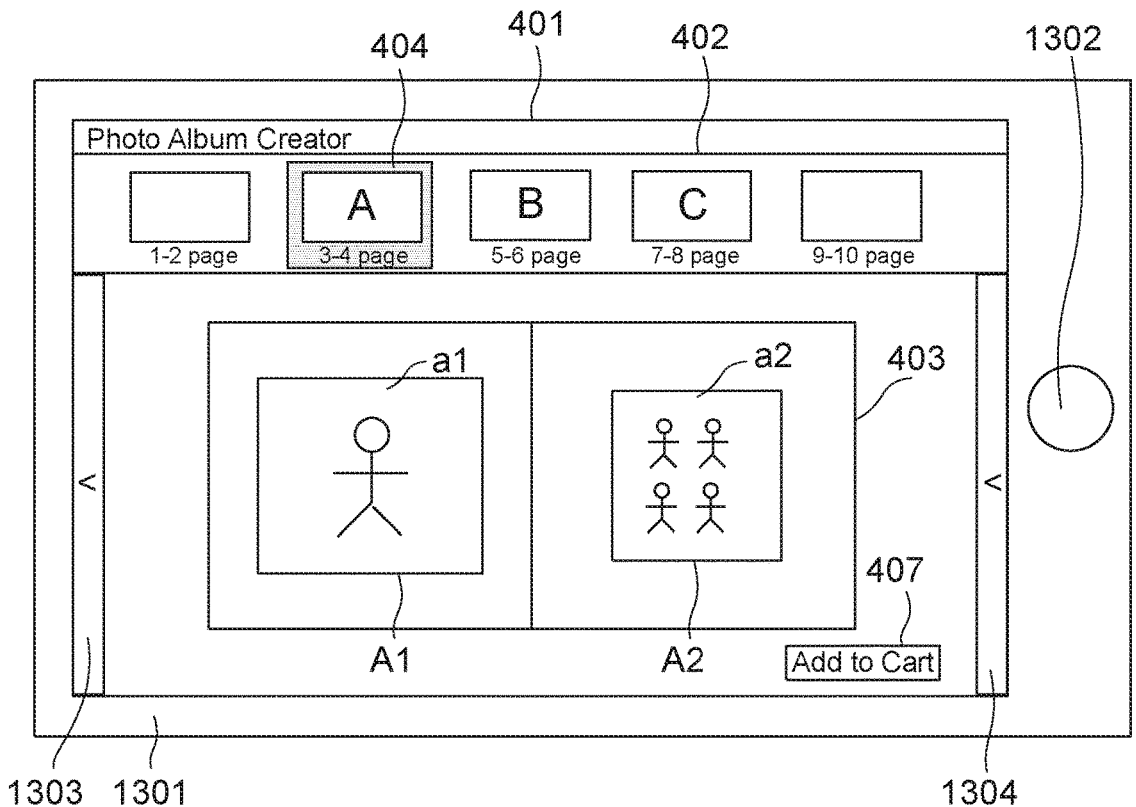
FIGS. 13A to 13F are schematic diagrams for describing a display control method.

In FIG. 13A, since the double-page spread A is selected in the display area 402 for the thumbnail, preview display of the double-page spread A is performed in the display area 403 of the photo album. It should be noted that the double-page spread A corresponds to the third page and the fourth page of the album. According to the template of the double-page spread A, slots A1 and A2 are set as photo arrangement areas, and the photos a1 and a2 are respectively arranged in the slots A1 and A2.

Figure 13B:
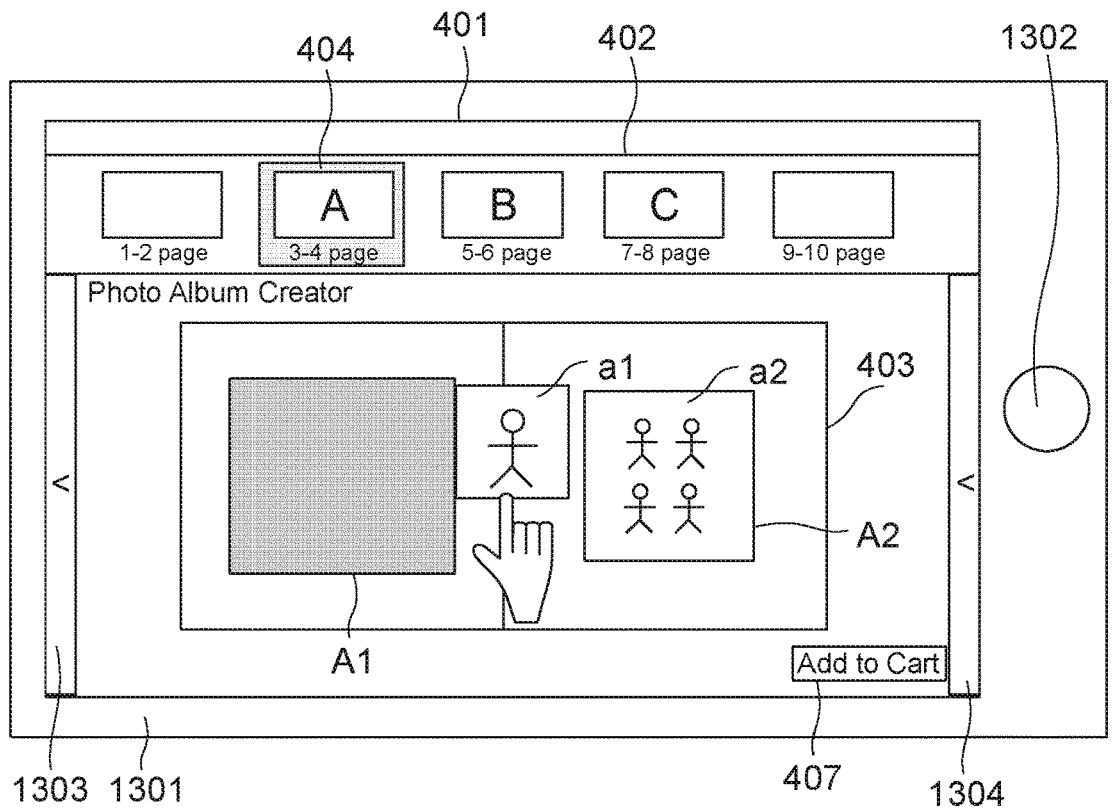

FIG. 13B illustrates a state in which the user performs the drag operation to hold the photo a1 in the slot A1. The state in which the photo a1 is dragged and held refers to a state in which a photo is extracted from the slot A1 photo a1. Thus, the state illustrates that the inside of the slot A1 is displayed in gray, and no photo is arranged.

Figure 13C:
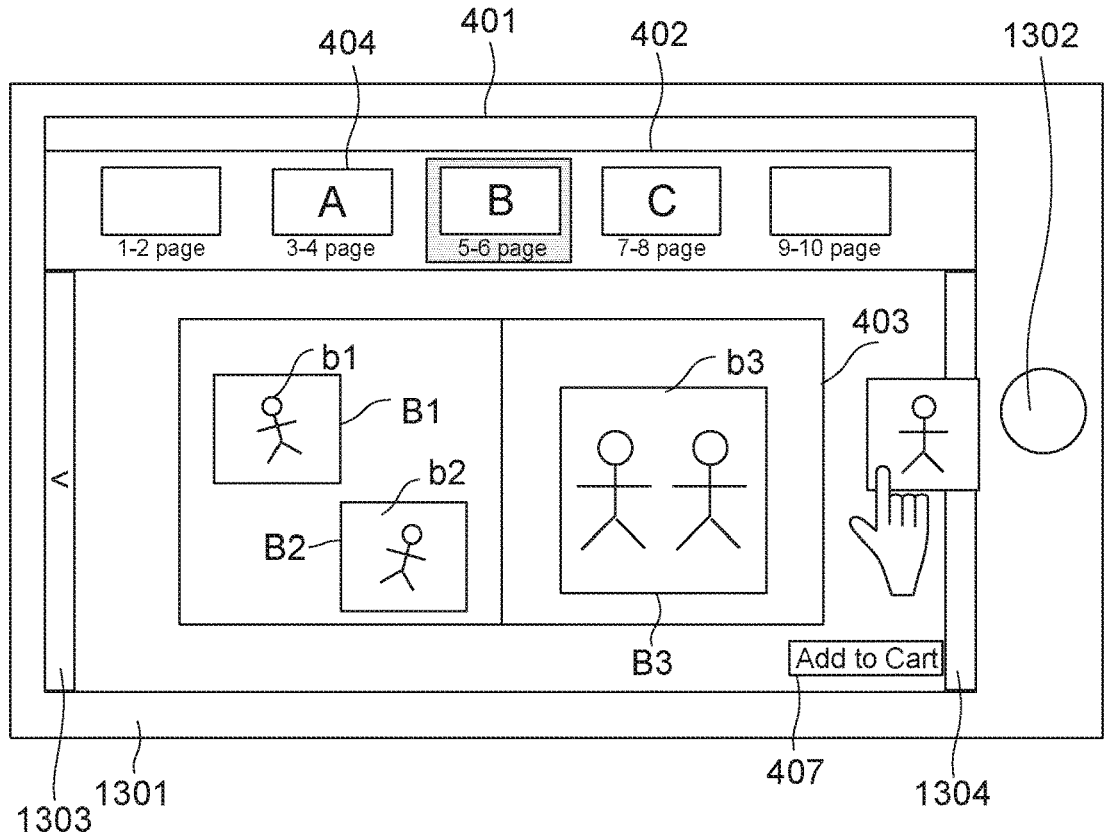
Figure 13D:
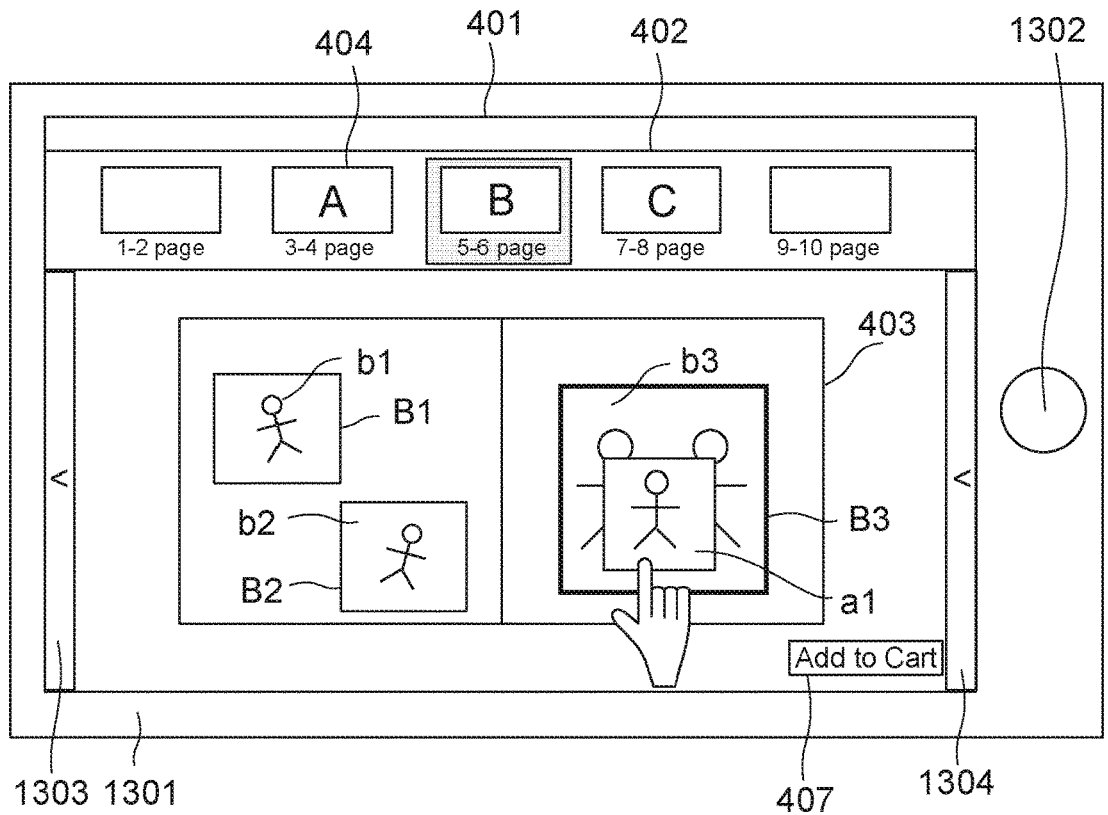

FIG. 13C illustrates a state in which the photo a1 subjected to the drag operation in FIG. 13B is moved into the next page turning area 1304 to be overlapped with the next page turning area 1304, and the display page is turned over to the double-page spread B as a result. When the photo is overlapped with the next page turning area 1304 at a page end part in the display area by the drag operation as described above, the display in the display area 403 of the photo album is switched to the double-page spread B. The double-page spread B corresponds to the fifth page and the sixth page of the album. The next page turning area 1304 is a page change area for displaying the next page in the display area. The display in the display area 403 is turned to the next page not only in a case where the image is overlapped with the next page turning area 1304 by the drag operation of the image but also in a case where the next page turning area 1304 is selected by the operation such as tap or click by the user. On the other hand, the previous page turning area 1303 is a page change area for displaying the previous page. When the photo held by the drag operation is moved to be overlapped with the previous page turning area 1303, the display in the display area 403 of the photo album is turned to the previous page. In addition, in a case where the previous page turning area 1303 is selected by tap, click, or the like, the display in the display area 403 of the photo album is turned to the previous page. It should be noted that, in FIGS. 13A to 13F, the display in the display area 403 is switched in units of the double-page spread, but the display switching according to the present exemplary embodiment may be performed for each page. As illustrated in FIG. 13C, the double-page spread B includes slots B1, B2, and B3, and photos b1, b2, and b3 are respectively arranged in the slots B1, B2, and B3.

In 13D, the dragged photo a1 is overlapped with the slot B3. When the dragged photo a1 is overlapped, a frame of the slot B3 thickens. This state indicates that the photo a1 can be arranged in the slot B3. In this state, when the drag of the photo a1 is cancelled to drop the photo a1, a state illustrated illustrates FIG. 13E is established.

Figure 13E:
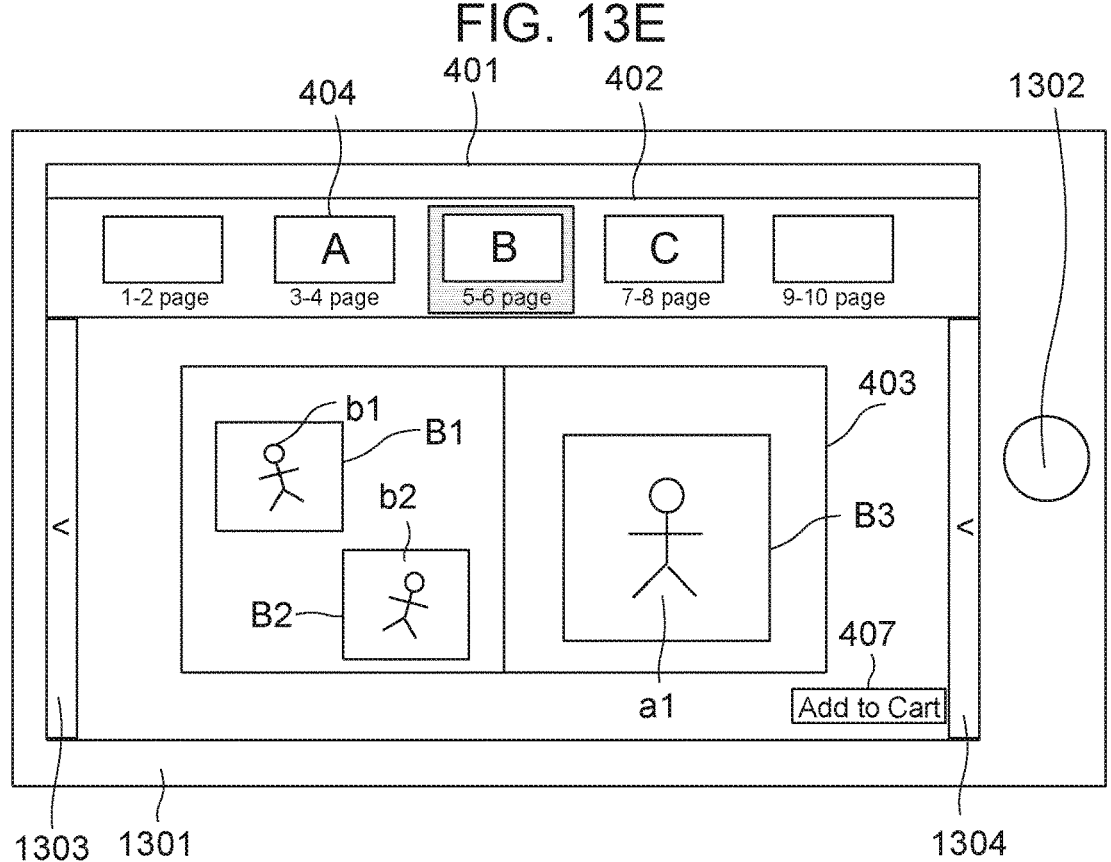

In FIG. 13E, it is understood that the photo a1 is arranged in the photo slot B3. It should be noted that, when the photo a1 is arranged in the photo slot B3, the photo b3 originally arranged in the photo slot B3 is arranged in the photo slot A1 where the photo a1 is arranged before the movement. That is, a state illustrated in FIG. 13F is established.

Figure 13F:
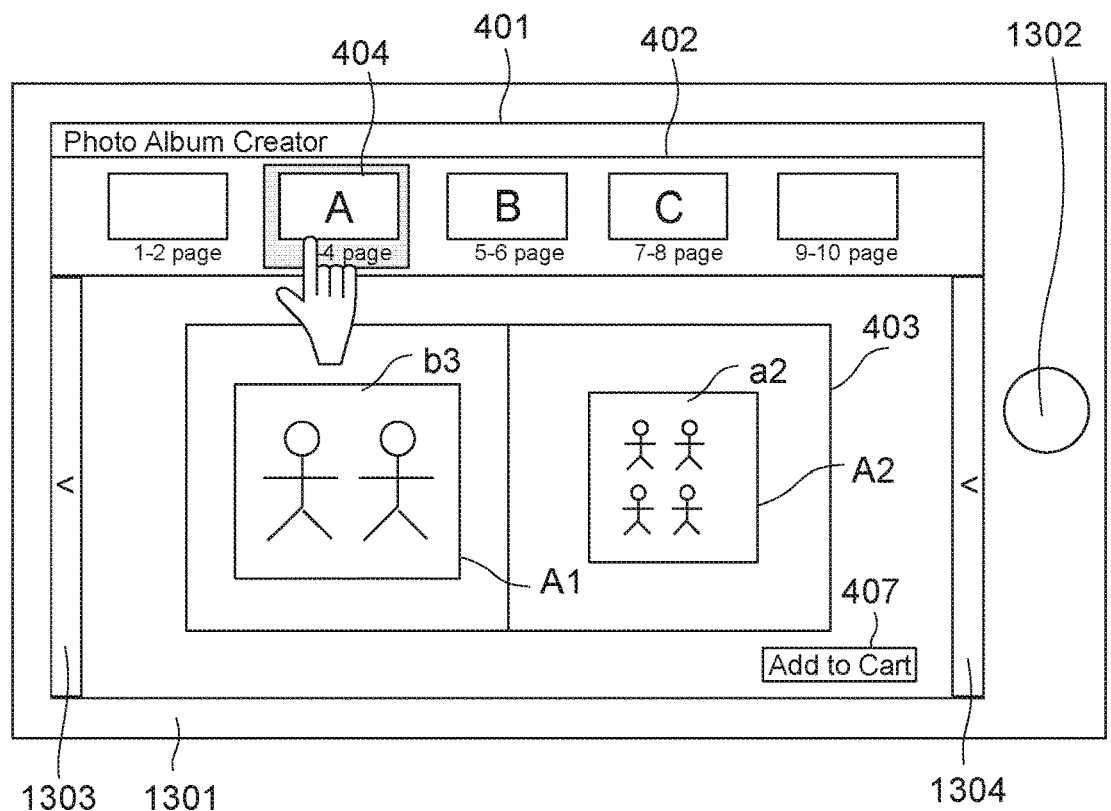

FIG. 13F illustrates a state in which preview display of the double-page spread A is performed in the display area 403 of the photo album when the double-page spread A is selected in the display area 402 for the thumbnail. The photo b3 is arranged in the photo slot A1, and it may be understood that the photo a1 and the photo b3 are swapped with each other.

In this manner, it is possible to change the photos arranged in the respective slots on the editing screen after the layout according to the present exemplary embodiment. Here, an issue that may occur on the editing screen when the photo is dragged will be described.

Figure 14A:
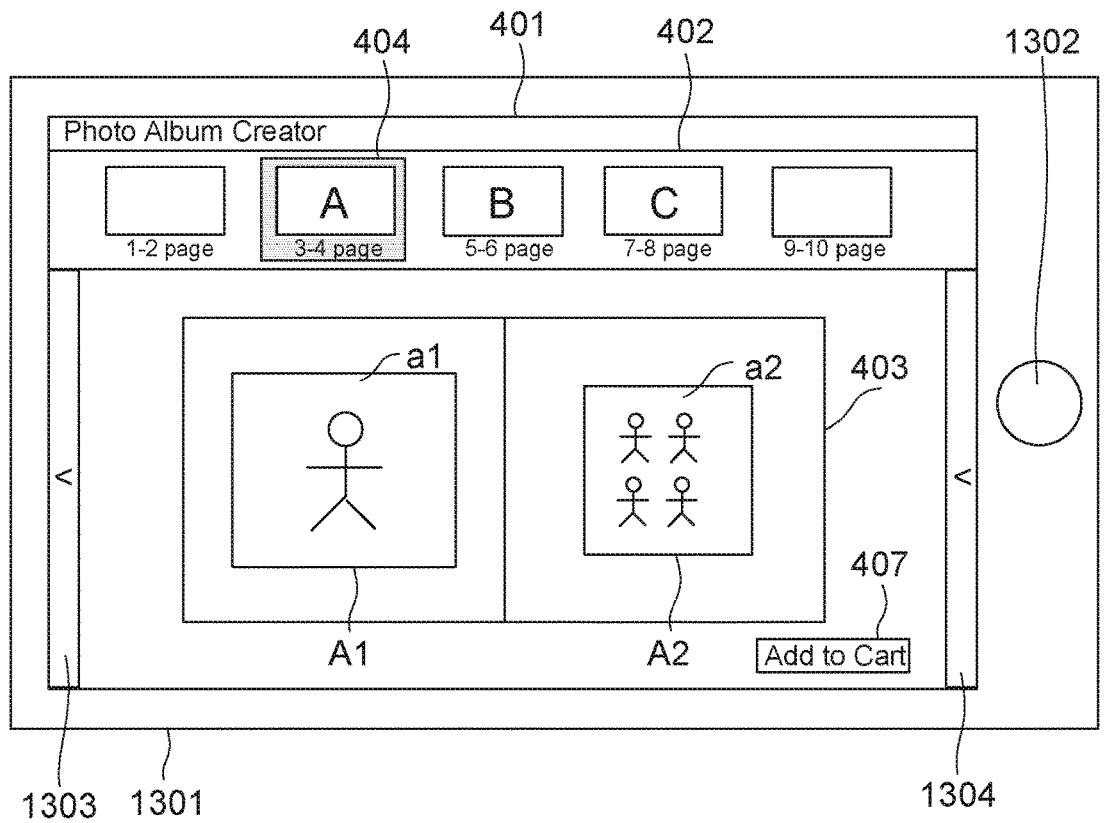
FIGS. 14A to 14F are schematic diagrams for describing the display control method.
Figure 14B:
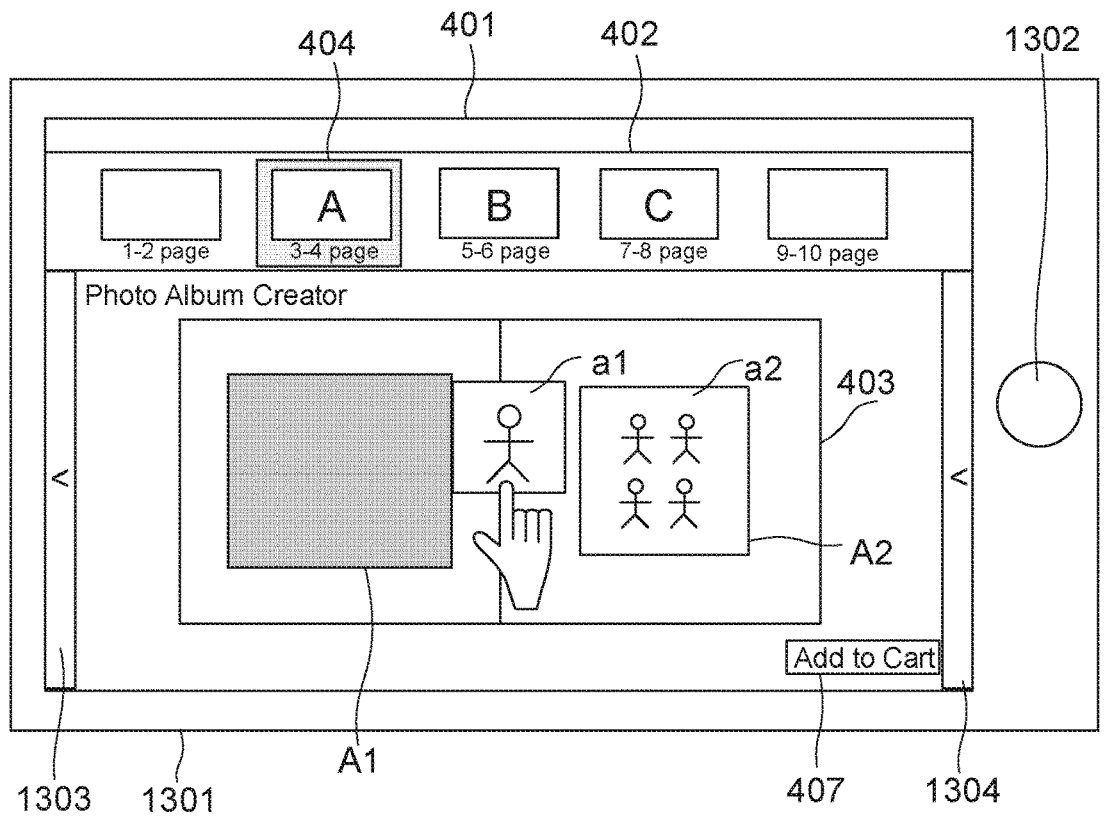
Figure 14C:
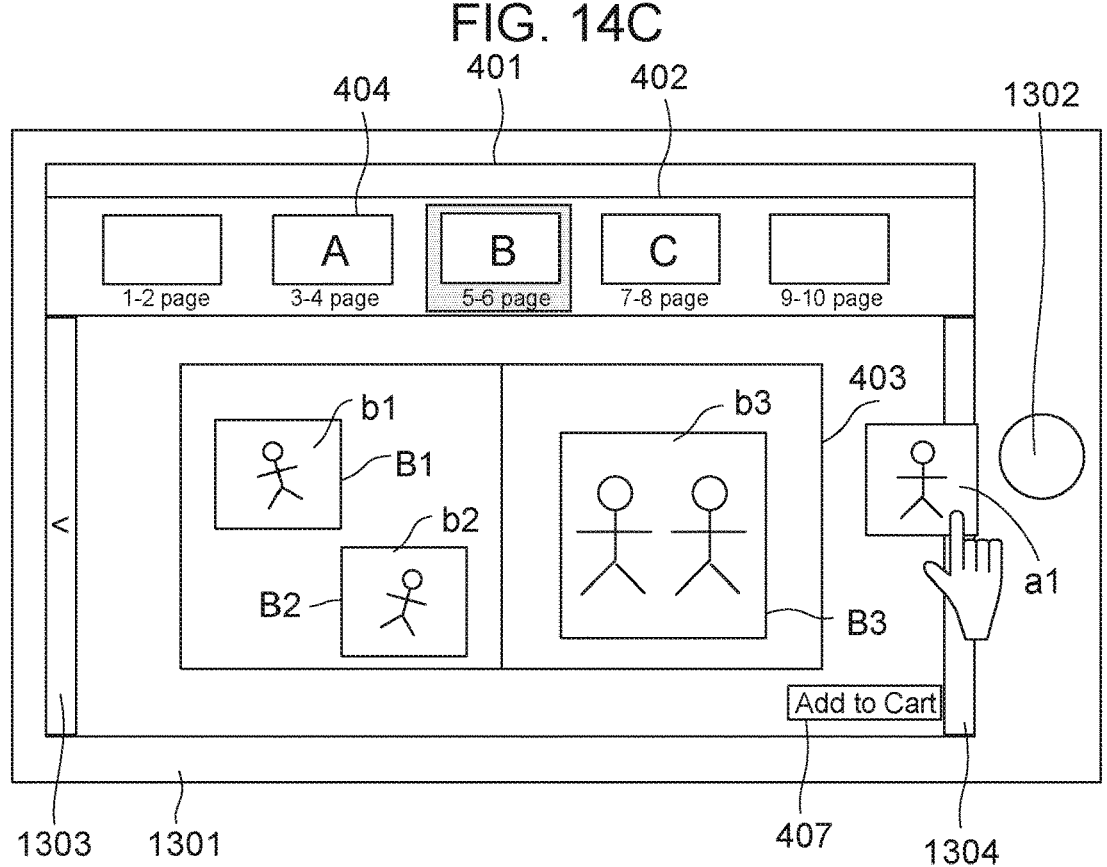

FIGS. 14A to 14F illustrate a state in which the photo a1 of the double-page spread A and the photo b3 of the double-page spread B are to be swapped with each other similarly as in FIGS. 13A to 13E Descriptions on FIGS. 14A and 14B will be omitted since the descriptions are similar to the descriptions on FIGS. 13A and 13B. FIG. 14C is a comparison example and illustrates a display control method different from that of FIG. 13C. In FIG. 14C, a central part of the photo a1 is shifted to the left side with respect to the input position of the user (corresponding to the touch position in the case of the touch panel). In other words, the touch position of the user appears to be shifted to a right end of the photo a1. The above-described state is established when the user swiftly performs dragging. That is, in a normal case, as illustrated in FIG. 14B, since the touch position is the same as the center of the photo a1, the center of the photo a1 is operated. However, when the user drags the photo a1 to the display area end part at a high speed for the page turning, the finger moves to a boundary of the display area (panel frame in the case of the full-screen display) or runs off from the panel frame in some cases before the page is turned over.

Figure 14D:
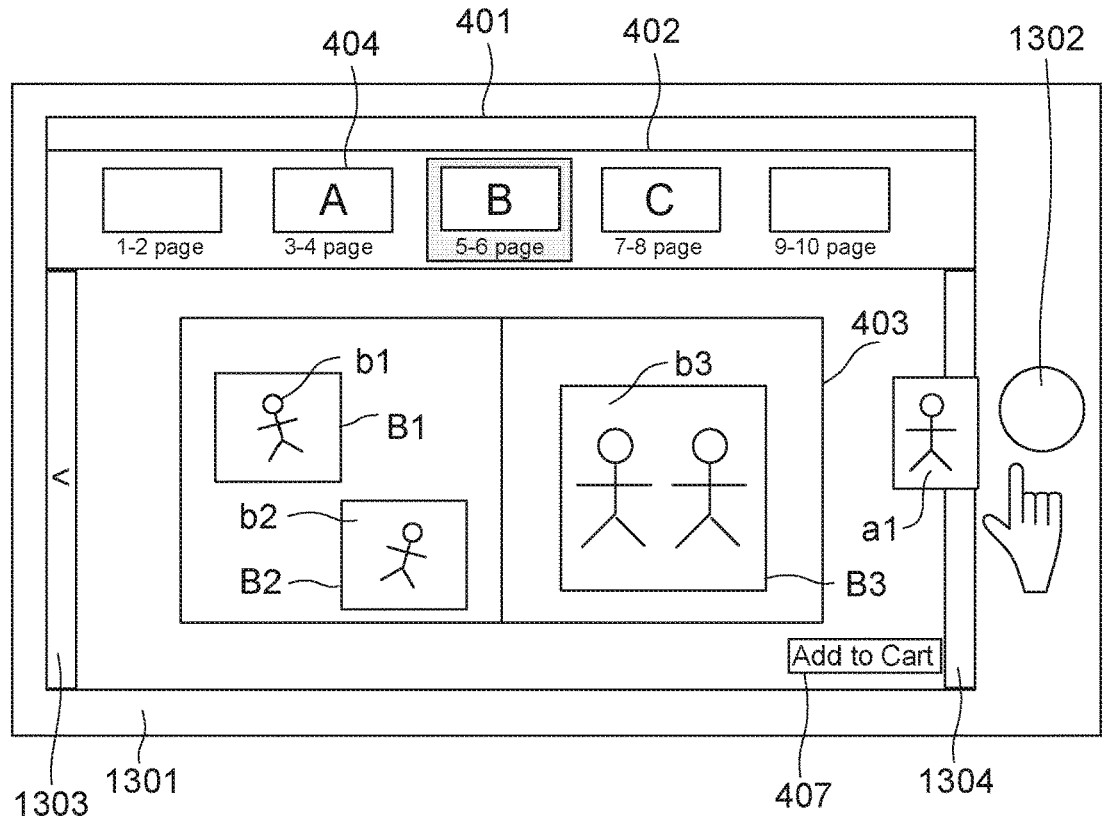

FIG. 14D is a schematic diagram illustrating a situation when the dragging finger leaves to the outside from the touch panel corresponding to the display area by an erroneous operation by the user. When the finger leaves out of the touch panel as described above, the touch operation is not detected. Thus, the drag operation of the photo a1 is cancelled, and cancel processing for cancelling the drag operation is started. The cancel processing according to the first exemplary embodiment is processing for arranging the item subjected to the drag operation (the photo a1 in this example) into any one of arrangement areas in the page by the release of the drag operation. The typical cancel processing includes returning the item to the original slot before the drag start.

Figure 14E:
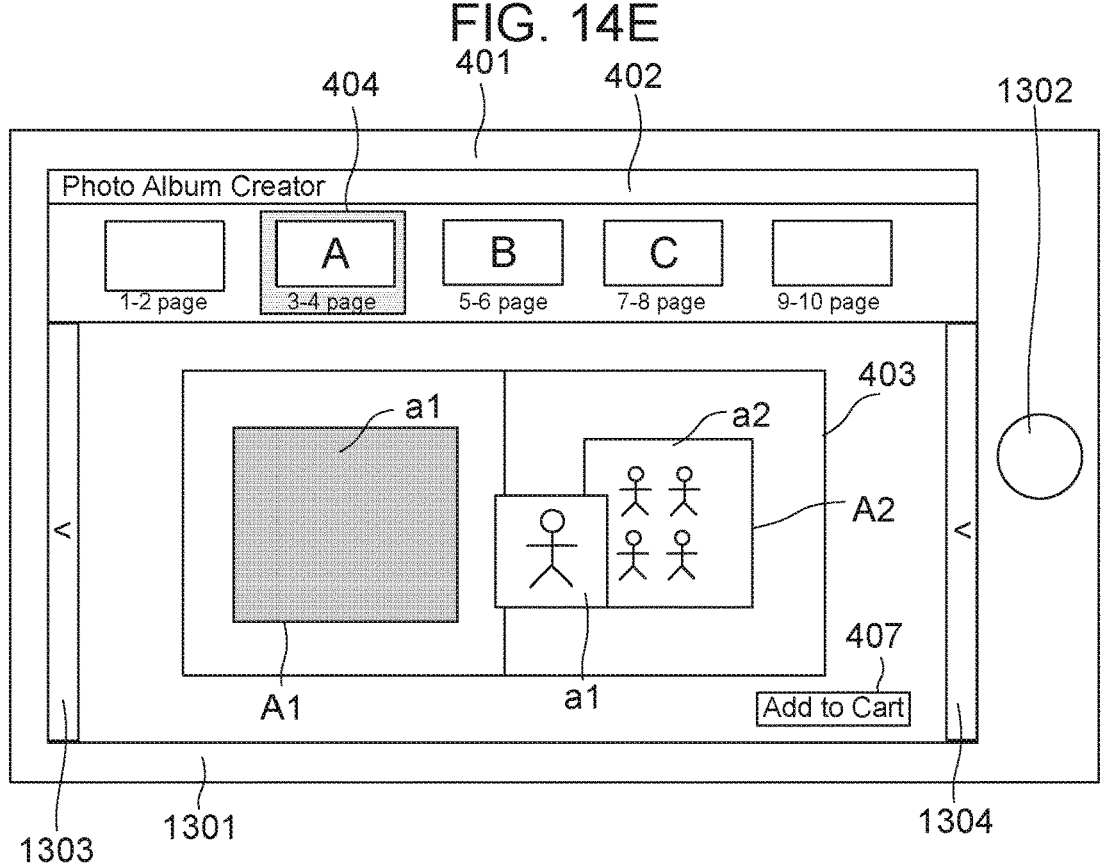

FIG. 14E illustrates a situation where the photo a1 is to return to the original slot A1 corresponding to the original arrangement area when the drag operation by the user is released. This state illustrates a situation during the cancel processing.

Figure 14F:
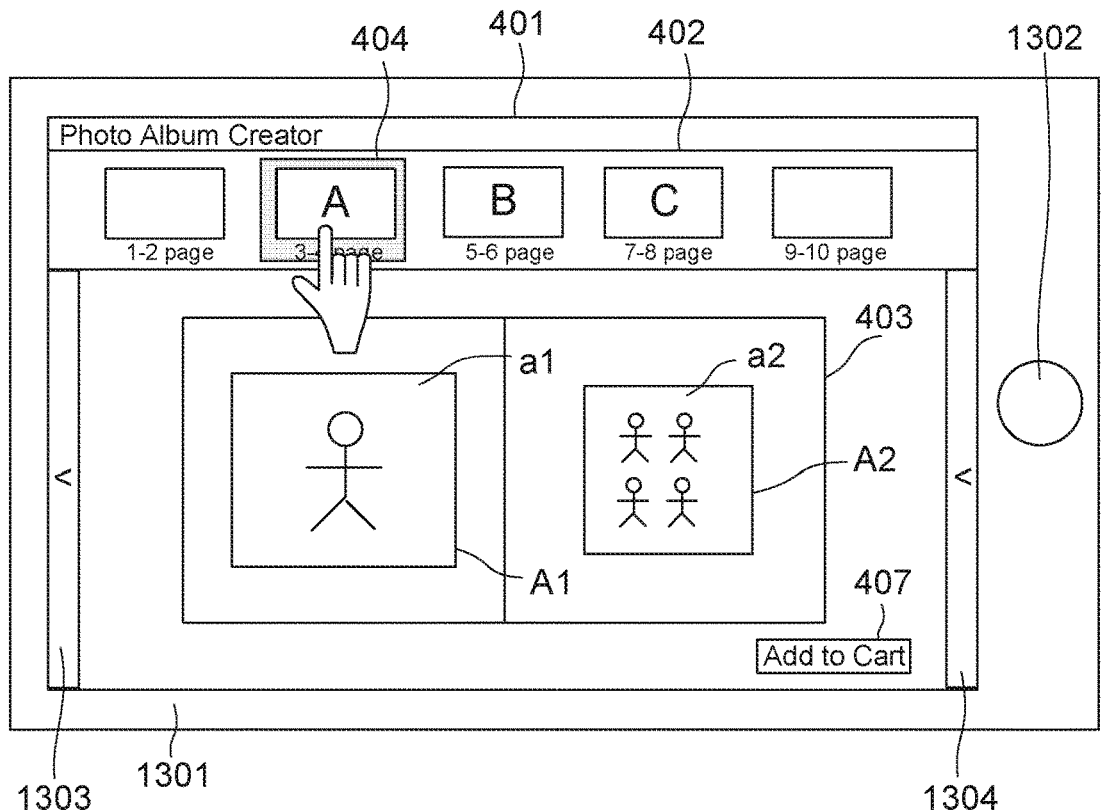

FIG. 14F illustrates a state in which the photo a1 returns to the original slot A1, and the cancel processing is completed. In this manner, when the dragging finger or pen runs off from the panel, the drag is treated as being cancelled. Thus, the drag is treated as being cancelled by an operation unintended by the user.

In view of the above, according to the present exemplary embodiment, a relative position of the item with respect to the input position of the user is controlled to decrease a probability of the occurrence of the above-described cancel processing unintended by the user.

Figure 15A:
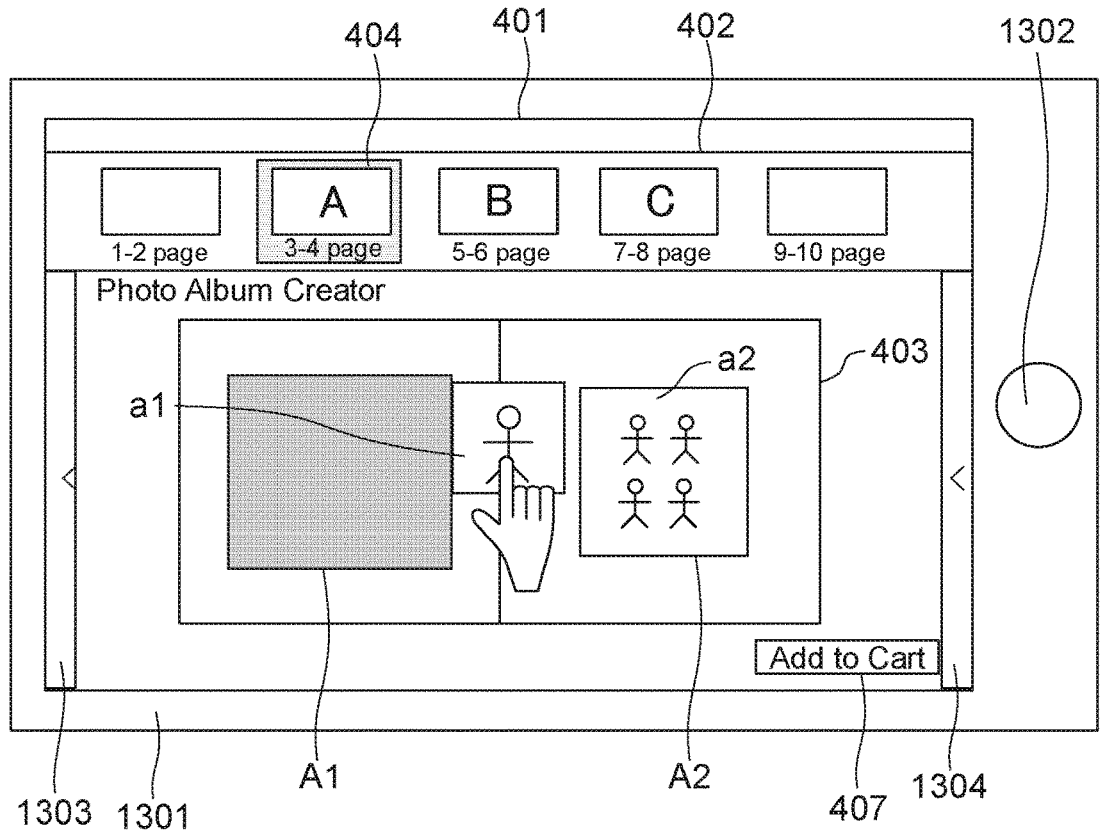
FIGS. 15A to 15E are schematic diagrams for describing the display control method.

FIGS. 15A to 15E are schematic diagrams for describing the display control method according to the present exemplary embodiment. FIG. 15A is similar to FIG. 13C and illustrates a state in which the photo a1 arranged in the photo slot A1 is dragged. In FIG. 15A, the photo a1 is located at the central part in the horizontal direction of the editing screen 401. At this time, a fingertip of the hand is sucked into the central part of the photo a1. That is, the touch position of the user and the central part of the photo a1 are matched with each other, and the user operates the center of the photo a1.

Figure 15B:
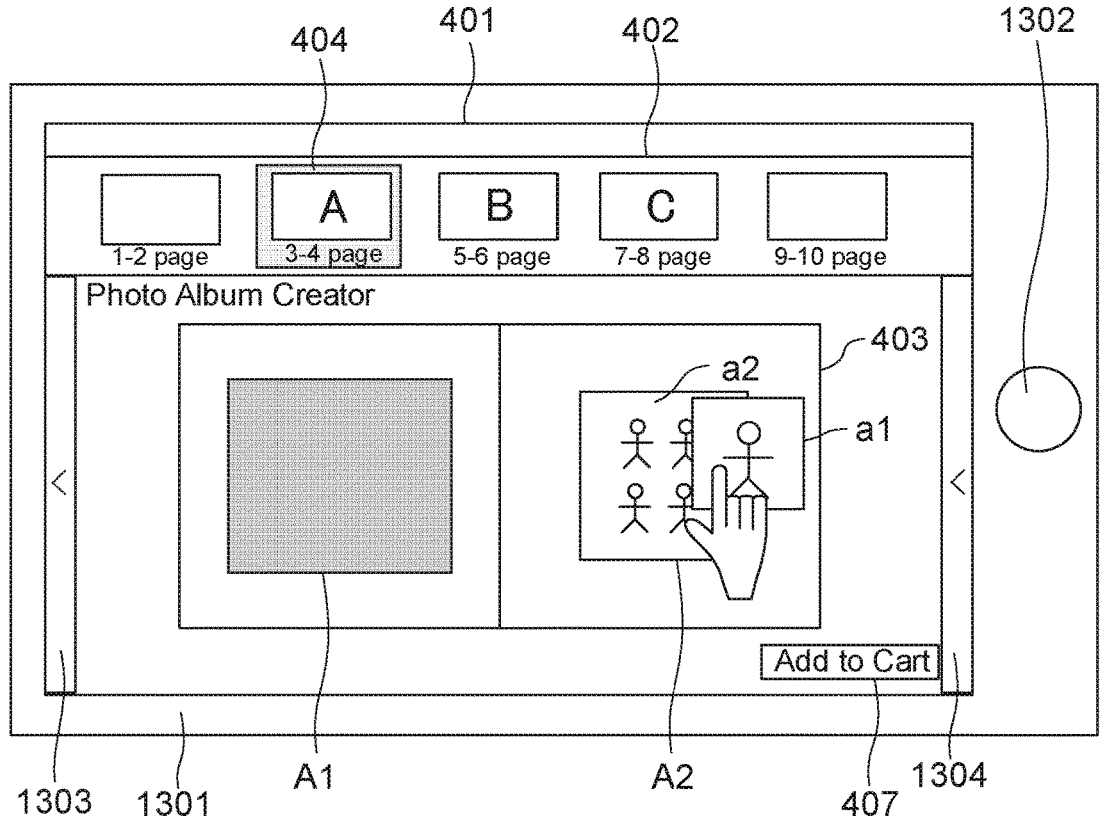
Figure 15C:
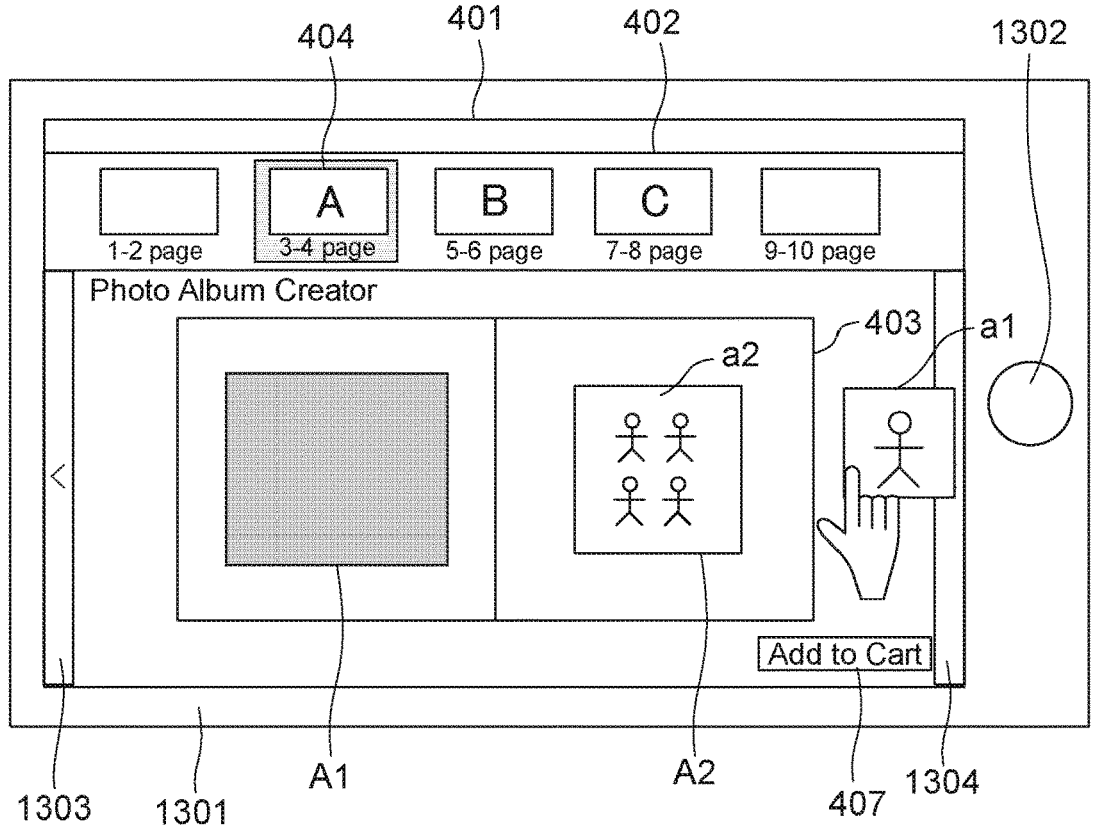

FIG. 15B and FIG. 15C are schematic diagrams illustrating a display state during a period between FIG. 13B and FIG. 13C. FIG. 15B illustrates a state in which the photo a1 is moved to the right side of the editing screen 401 by the drag operation. At this time, the finger is sucked into the left side of the photo a1. That is, the relative position of the photo a1 is shifted to the right side with respect to the touch position of the user. In other words, the operation position of the user is at the position on the left side with respect to the center of the photo a1, and the user appears to operate the left side with respect to the center of the photo a1.

FIG. 15C illustrates a situation where the photo a1 is further moved to the end part on the right side by the drag operation, and part of the photo a1 is overlapped with the next page turning area 1304. At this time, the fingertip of the hand is sucked into the further left end part of the photo a1 as compared with FIG. 15B. That is, the relative position of the photo a1 is further shifted to the right side with respect to the touch position of the user. In other words, the operation position of the user is a position on the right side with respect to the center of the photo a1, and the user appears to operate the further left end of the photo a1.

Figure 15D:
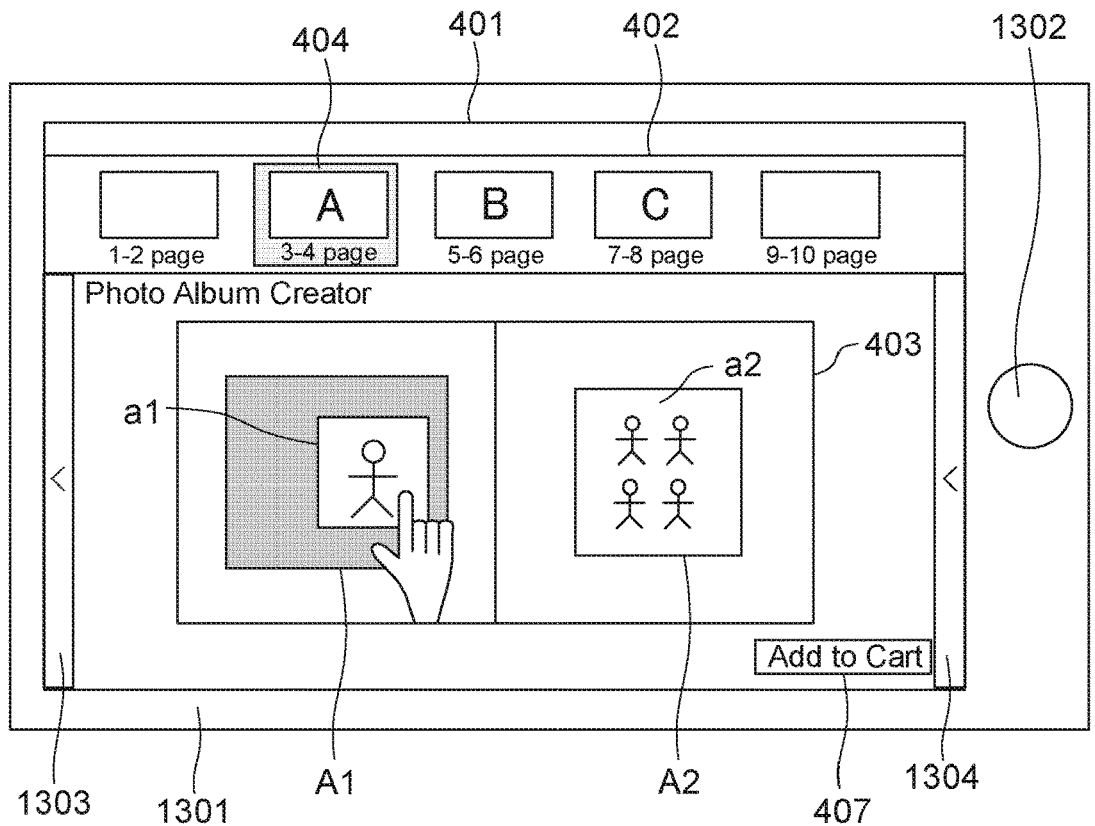
Figure 15E:
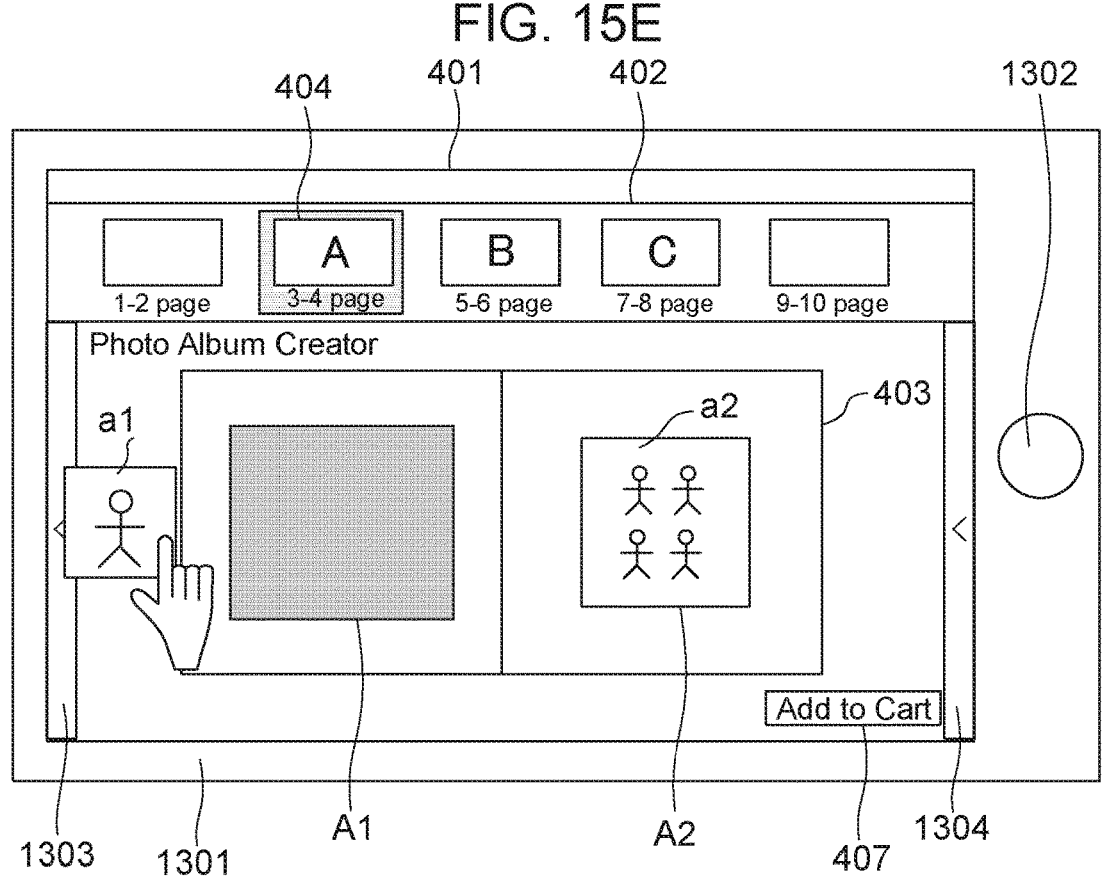

It should be noted that FIG. 15D and FIG. 15E are schematic diagrams in a case where the photo a1 is moved to the left side of the editing screen 401 for the photo album. In FIG. 15D, the right side of the photo a1 is sucked into the finger. That is, the photo a1 is relatively shifted to the left side with respect to the touch position of the user. Furthermore, FIG. 15E illustrates a case where the photo a1 is moved to the end part on the left side on the opposite side to the editing screen 401 to overlap the photo a1 with the previous page turning area 1303. At this time, the fingertip of the hand is sucked into the right end part of the photo a1. That is, the relative position of the photo a1 is further shifted to the left side with respect to the touch position of the user.

In this manner, according to the present exemplary embodiment, the position where the photo is sucked into the dragging finger or pen is changed in accordance with the touch position during the drag on the editing screen 401. The position where the photo is sucked into the finger or the pen is changed depending on the touch position during the drag in the horizontal direction of the editing screen 401 for the photo album. As the dragged photo is moved to the right side, the sucking position is moved to the left side of the photo. On the contrary, as the dragged photo is moved to the left side, the sucking position is moved to the right side of the photo. That is, when the photo is moved to the right side by the drag operation, the photo is relatively shifted to the right side with respect to the touch position (typically, the central part of the photo exists on the right side by the touch position). When the photo is moved to the left side by the drag operation, the photo is relatively shifted to the left side with respect to the touch position (typically, the central part of the photo exists on the left side by the touch position).

With the above-described control, when the photo is located at the right end of the editing screen 401, the photo is leaning over the right side as compared with the touch position. Thus, before the finger is moved to the right end of the touch panel, it is possible to overlap the currently dragged photo with the next page turning area 1304. Therefore, the page can be turned over before the finger reaches the right end of the touch panel. When the photo is at the left end of the editing screen 401, the photo is leaning over the left side by the touch position. Thus, the currently dragged photo can be overlapped with the previous page turning area 1303 before the finger is moved to the left end of the touch panel. Therefore, the page can be turned over before the finger reaches the left end of the touch panel. In a case where the control is performed as described above, the page can be changed even when the finger or the pen does not reach the extreme end of the touch panel. Therefore, it is possible to decrease the probability that the hand erroneously runs off from the terminal.

Figure 16A:
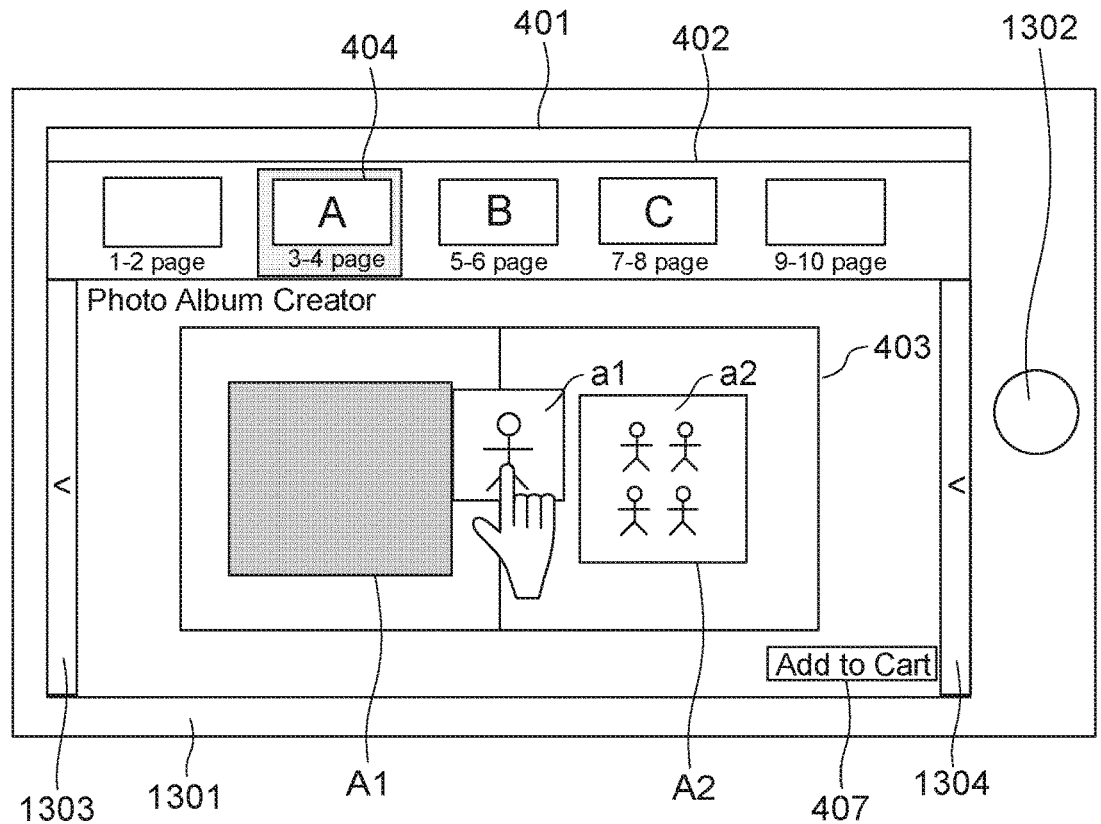
FIGS. 16A to 16E are schematic diagrams for describing the display control method.
Figure 16B:
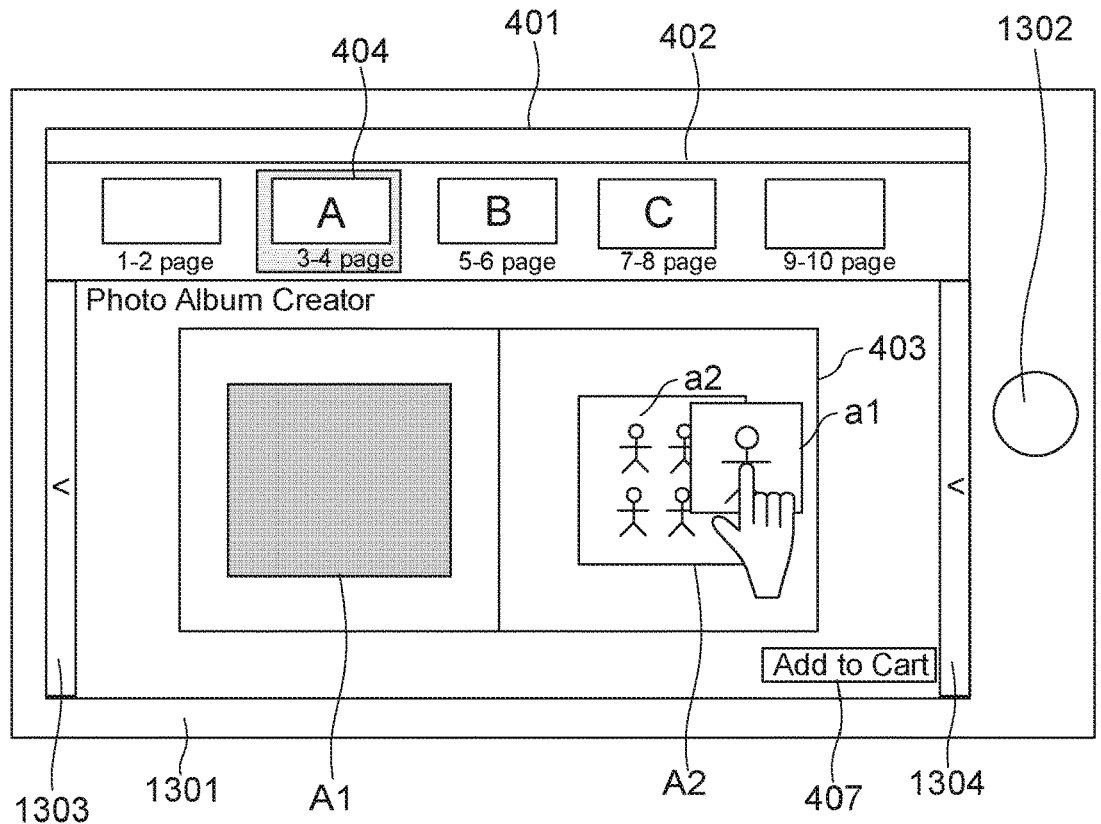
Figure 16C:
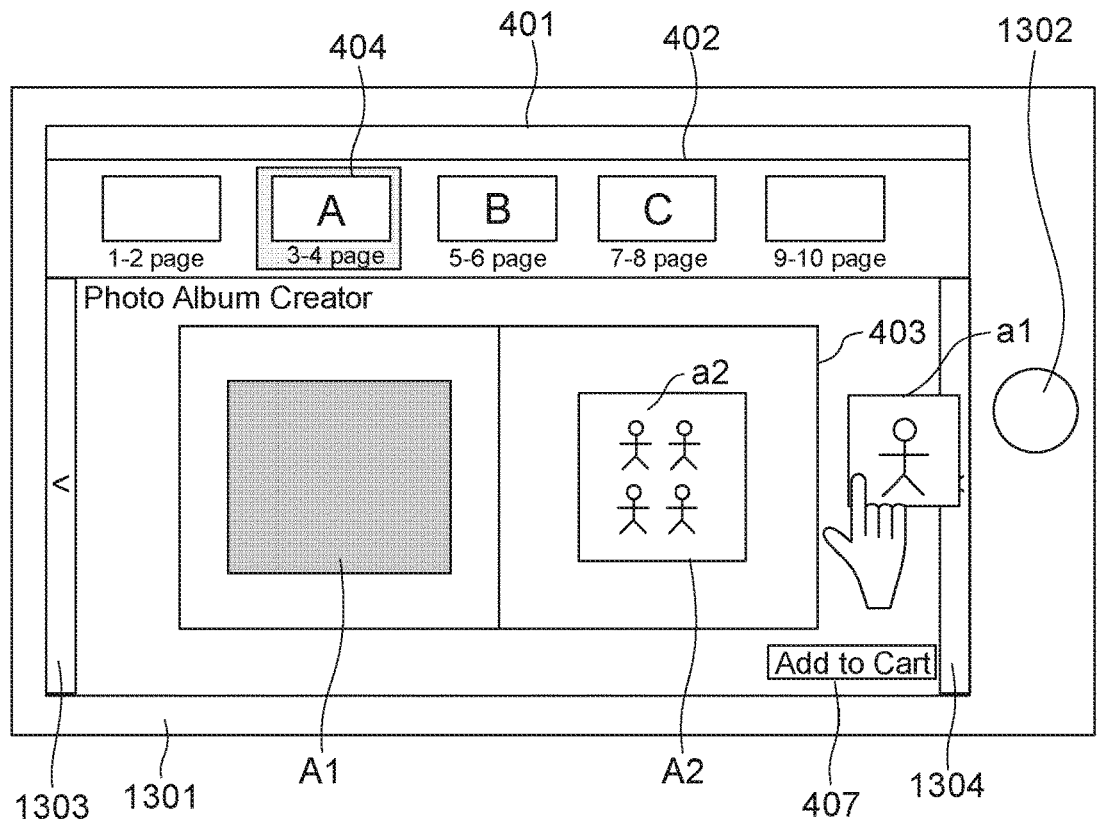
Figure 16D:
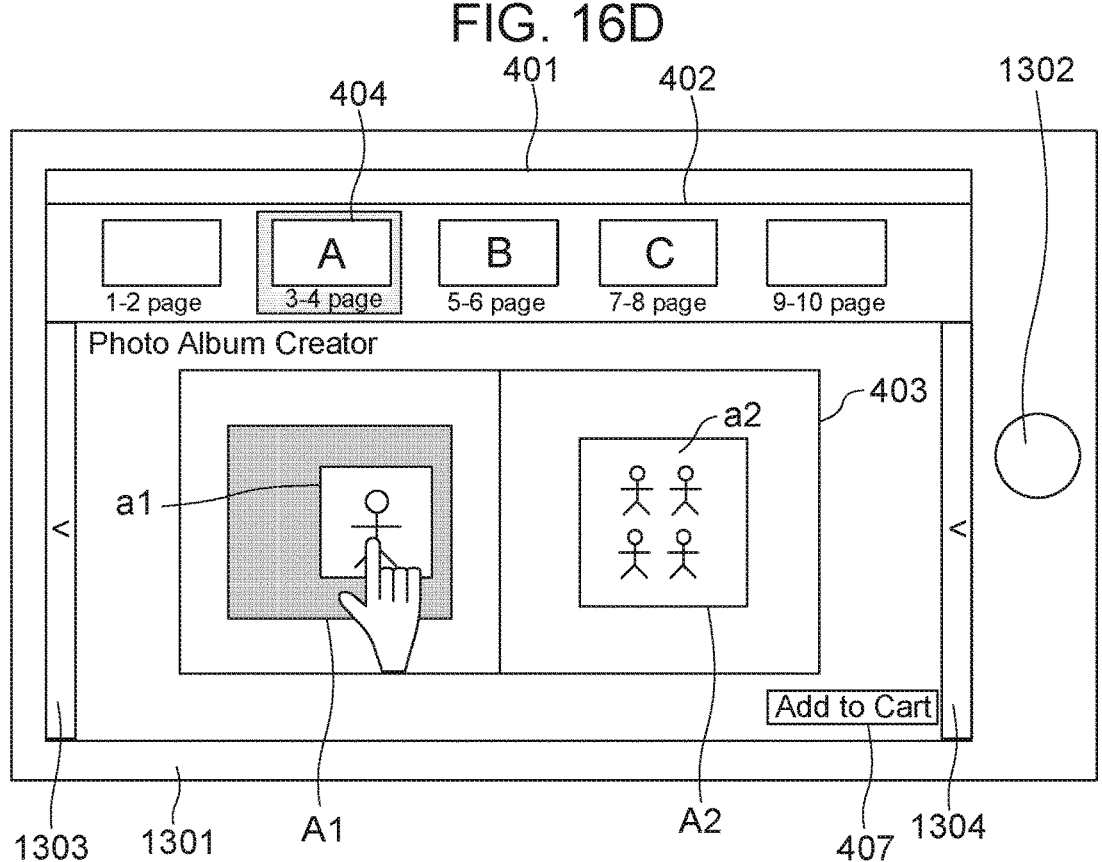
Figure 16E:
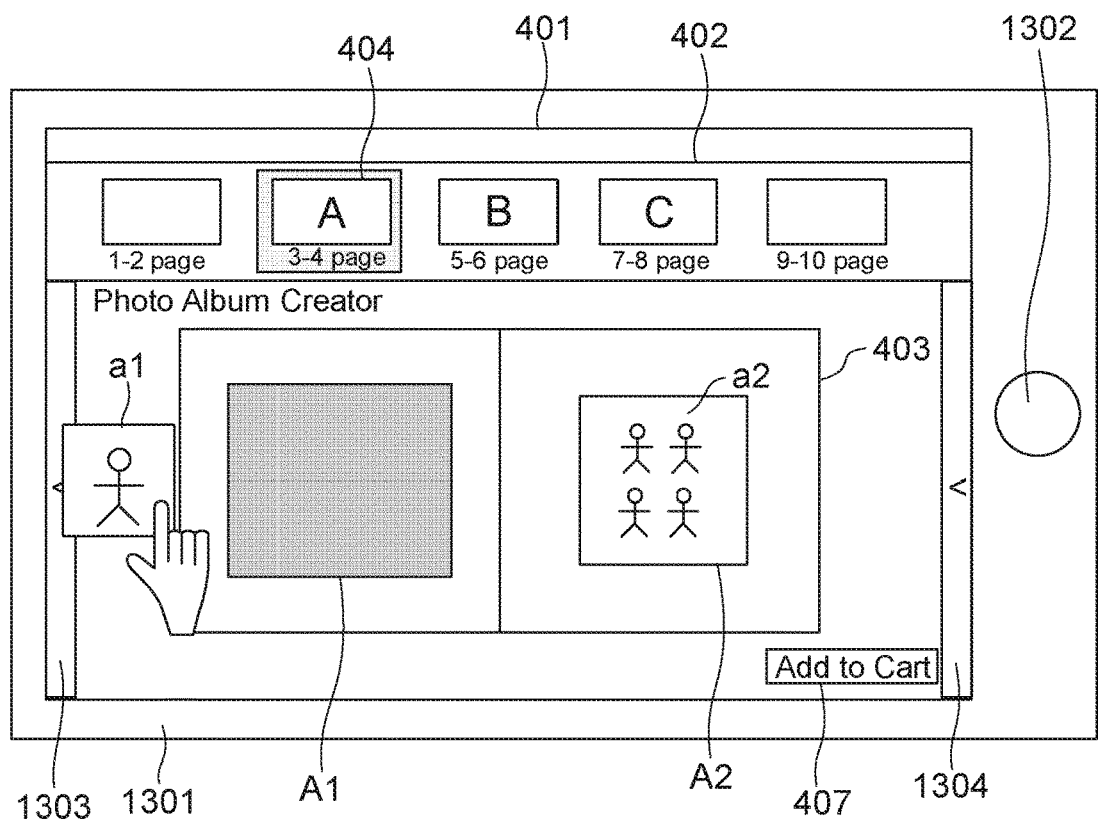

It should be noted that, in the example of FIGS. 15A to 15E, the relative position of the photo with respect to the touch position is gradually (continuously) moved so as to be shifted in accordance with the position of the currently dragged photo in the horizontal direction of the editing screen 401, but the present exemplary embodiment is not limited to the above. That is, the relative position of the photo with respect to the touch position may be shifted only when approaching the end part instead of the shift in the continuous manner. FIGS. 16A to 16E illustrate an example thereof. FIGS. 16A, 16C, and 16E are similar to FIGS. 15A, 15C, and 15E. The center of the photo corresponds to the touch position at the center of the editing screen, and the photo is leaning over the end part side as compared with the touch position at the end part of the editing screen. On the other hand, as being different from FIG. 15B, irrespective of the movement towards the right side of the editing screen in FIG. 16B, the touch position corresponds to the central part of the photo. Similarly as in FIG. 16D, irrespective of the movement towards the left side of the editing screen, the touch position corresponds to the central part of the photo. In this manner, according to the present exemplary embodiment, as in the example of FIGS. 16A to 16E, the control may be performed to shift the relative position of the photo with respect to the touch position only in the area at the end part.

In addition, according to the present exemplary embodiment, even when the position of the photo is at any position in the horizontal direction of the editing screen 401, the central part of the photo may be sucked into the touch position immediately after the photo is touched for the drag (at a timing when the photo is held but the movement is not yet performed). That is, the touch position and the central part of the photo may be matched with each other. Then, in a case where the movement is performed by the drag operation thereafter, as described with reference to FIGS. 15A to 15E and FIGS. 16A to 16E, the sucking position in the item with respect to the touch position may also be changed. For example, even in a case where the photo in the slot close to the end of the editing screen 401 is dragged, the central part of the photo may be sucked into the touch position at the timing of the touch, and the sucking position may be shifted from the center for the first time when the photo is moved by the drag operation. In this manner, since the sucking into the photo central part occurs when being sucked into the finger for the first time, it becomes clear that the photo is held for the drag operation, and it is possible to give a sense of reassurance to the user as compared with a case where the sucking into the end part of the photo occurs from the beginning.

As described above, with the application of the present exemplary embodiment, the page can be changed even when the finger or the pen does not reach the extreme end of the touch panel. Therefore, it is possible to decrease the probability that the hand erroneously runs off from the terminal. It should be noted that, even with the application of the above-described method, a possibility that the finger runs off from the touch panel is not zero depending on the operation method for the user. In view of the above, a configuration is preferably adopted in which, even in a case where the finger erroneous runs off, the cancel processing for the drag is stopped in mid-course, and the drag can be resumed again. That is, as described with reference to FIG. 14E and FIG. 14F, the drag can be preferably resumed before the photo unintentionally returns to the original slot (arrangement positions before the drag start).

Therefore, according to the present exemplary embodiment, in a case where the drag is cancelled in an area other than the arrangement area (position that is not the slot), control may be performed in a manner that the photo returns to the original slot after an elapse of a predetermined time instead of a configuration in which the photo swiftly returns to the original slot. That is, the predetermined time is provided since the cancellation of the drag until the completion of the cancel processing (in which the photo returns to the original slot). The photo where the drag is released remains in a predetermined range (typically, the position where the drag is cancelled) during the predetermined time, and the photo returns to the original slot after the elapse of the predetermined time. While the photo remains in the predetermined range, that is, before the cancel processing is completed, when the user touches the touch panel again, the cancel processing is stopped, and the user can resume the drag.

It should be noted that the photo preferably executes predetermined animation while the photo stands by in the predetermined range during a mid-stream period of the cancel processing. For example, the photo is caused to rotate or fluctuate, become gradually transmissive, or flash. Thus, it becomes easy to understand that the photo is in a standby state, and visibility is improved.

In addition, the operation by the user for stopping the cancel processing is not limited to only the touch on the photo remaining in the standby range. For example, the cancel processing may also be stopped when a display area different from the photo is touched. Control may also be performed in a manner that the photo is moved to the touched position, and the photo appears to be sucked into the touched position.

Control Flow

Figure 19:
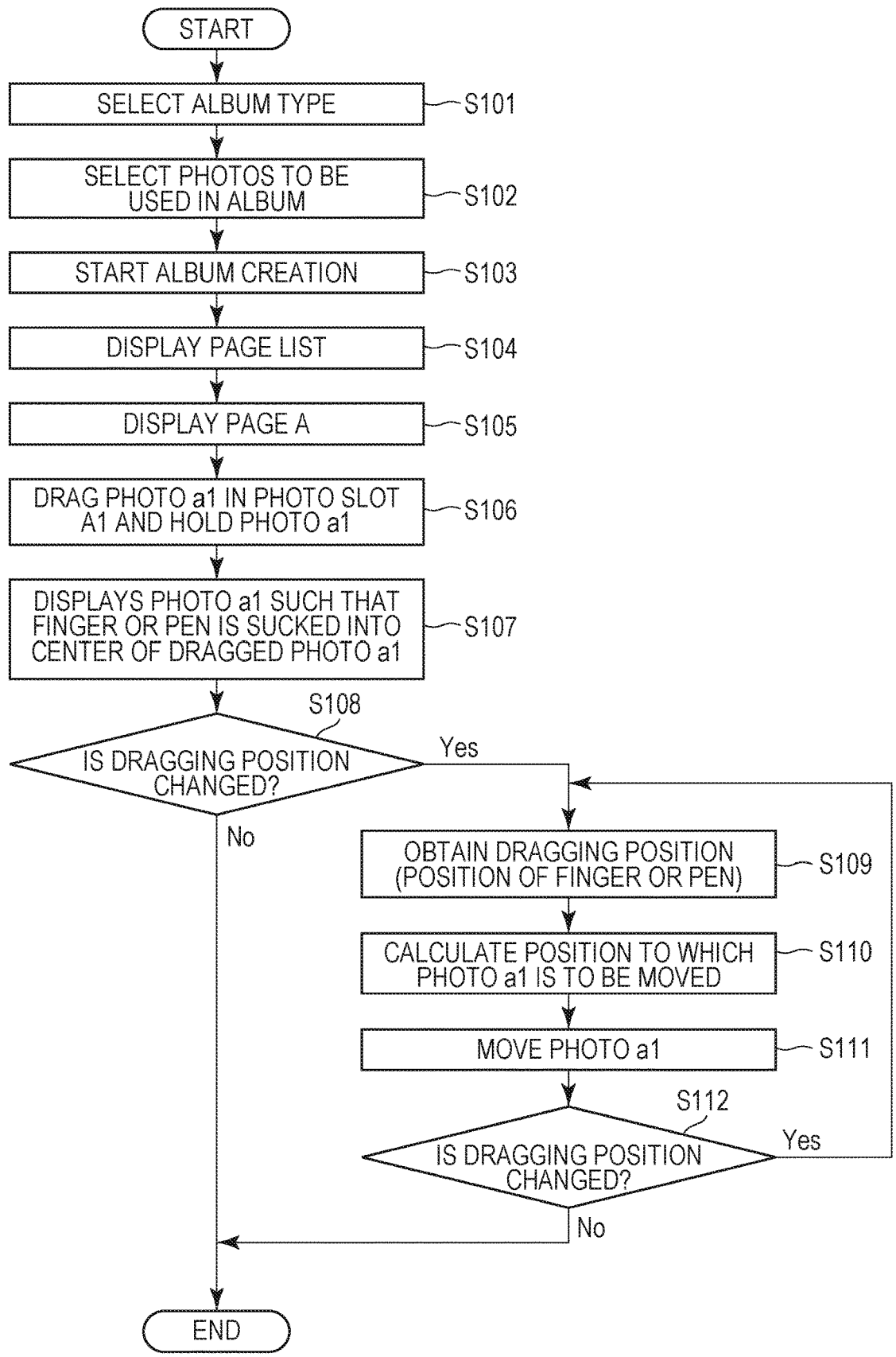
FIG. 19 is a flow chart illustrating the display control method.

Next, a flow of the display control method according to the present exemplary embodiment will be described. FIG. 19 is a flow chart illustrating a display control flow related to the display of the item described with reference to FIGS. 15A to 15E. The flow chart illustrated in FIG. 19 is realized, for example, when the CPU 204 reads out the program stored in the HDD 202 onto the ROM or the RAM 201 to be executed.

It should be noted that S101 to S103 illustrate an overview of a series of flows related to the automatic layout processing illustrated in FIG. 6. In S101, the CPU 204 selects and sets a type of the photo album on the basis of an instruction from the user. The type of the photo album refers, for example, to a size of the photo album, the number of pages, a binding method, a type of paper, or the like. In S102, the CPU 204 selects and sets a photo group used for the automatic layout of the photo album on the basis of an instruction from the user. For example, in a case where the photo is saved in a picture folder, the user selects a predetermined folder in the picture folder, and the CPU 204 selects the photo group in the above-described folder as the layout target. In S103, the CPU 204 starts creation of the photo album. For example, in accordance with the type of the photo album selected in S101 and the photo group selected in S102, the CPU 204 selects the template for automatically arranging the photos and automatically arranges the photos in the slots in the selected template. It should be noted that the mode for automatically performing the image layout has been described herein, but the present exemplary embodiment is not limited to the above. The user may manually select the template or the photo to create the photo album.

In S104, the CPU 204 displays a thumbnail list of the page after the layout in the display area 402.

In S105, the user selects a thumbnail corresponding to a desired page of the display area 402 (in this example, the double-page spread A is assumed). The CPU 204 displays the second page and the third page of the double-page spread A in the display area 403 (corresponding to FIG. 13A). The user can manually correct the layout image of the automatic layout result on this screen.

In S106, the CPU 204 drags the photo a1 of the double-page spread A in the slot A1 to be held and moved to the photo a1 on the basis of an input from the user.

In S107, the CPU 204 displays the photo a1 in a manner that the finger is sucked into the center of the dragged photo a1.

In S108, the CPU 204 determines whether or not an input position of the dragging finger (that is, the touch position) is changed. In S108, in a case where it is determined that the input position is changed (S108: YES), the flow proceeds to S109. In a case where the input position is not changed (S108: NO), the processing is ended.

In S109, the CPU 204 obtains the input position of the dragging finger. The input position is calculated from coordinates on the display area.

Figure 21:
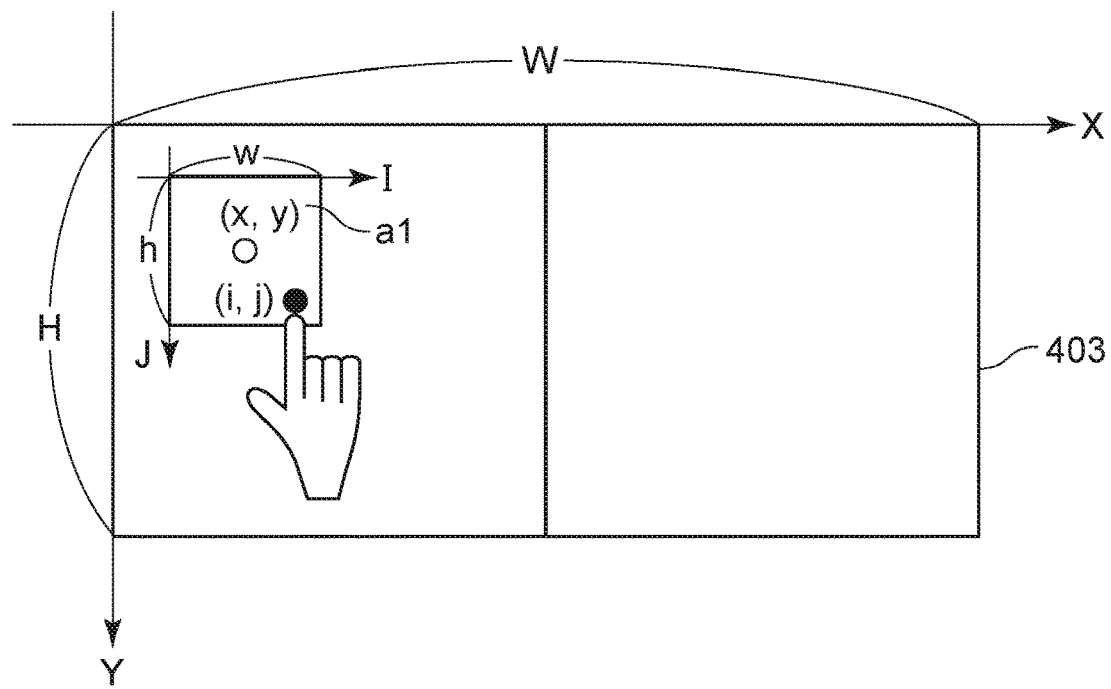
FIG. 21 is a schematic diagram for describing the display control method.

In S110, the CPU 204 obtains a position of the photo a1 after the movement on the basis of the input position of the finger obtained in S109. A specific calculation method for the position after the movement will be described with reference to FIG. 21. In FIG. 21, a width of the album display area is denoted by W, a height of the album display area is denoted by H, a width of the dragged photo a1 is denoted by w, and a height of the dragged photo a1 is denoted by h. A central position of the photo a1 after the drag is represented as (X, Y)=(x, y) on an x axis and a y axis indicating the album display area. In addition, the position where the sucking into the finger occurs is represented by (I, J)=(i, j) on an I axis and a J axis based on the position of the dragged photo. At this time, (i, j) is calculated by the following expressions.

$$i = (w \times (1 - x/W))$$

$$j = (h \times (1 - y/H))$$

It should be noted that these calculation expressions are merely examples, and other calculation expressions may also be used. Any calculation expressions may be used as long as the position of the photo sucked into the finger is changed depending on the dragged position. In addition, calculation expressions for changing calculation methods for (i, j) depending on a size of a display of a terminal may be used. For example, since the movable amount in the vertical direction is small in the case of a horizontally long display, a shift width in the vertical direction or the like may be increased.

In S111, the CPU 204 moves the photo a1 to the position calculated in S110. That is, the CPU 204 displays the photo a1 in a manner that the position (i, j) on the photo is sucked into the input position of the finger on the basis of the position calculated in S110.

In S112, the CPU 204 determines whether or not the dragging input position is changed. In S112, it is determined that the input position is changed (S112: YES), the flow proceeds to S109 again. It is determined that the input position is not changed (S112: NO), the processing is ended.

Second Exemplary Embodiment

According to the present exemplary embodiment, an example will be described in which a predetermined photo in a photo thumbnail list displayed on a display unit of a terminal apparatus such as, for example, a smart phone or a tablet as an item is moved. Since a configuration of the information processing apparatus 1 functioning as the terminal apparatus is similar to that of the first exemplary embodiment, descriptions thereof will be omitted. With regard to the flow of the display control, different aspects from the first exemplary embodiment will be mainly described.

FIGS. 17A to 17H are schematic diagrams illustrating a screen where thumbnails of the photos are displayed in a list according to the present exemplary embodiment. In FIGS. 17A to 17H, 16 photos are displayed on a thumbnail list screen 1701. Herein, the respective photos will be referred to as P1, P2, . . . , P16. FIGS. 17A to 17H illustrate an example in which the thumbnails of the photos are rearranged on the thumbnail list screen 1701, and this corresponds to an example in which the photo P11 is dragged to rearrange the photo. A scroll bar 1702 for performing vertically scroll is provided on the thumbnail list screen 1701, and the photo that is not displayed yet can be displayed when the user operates the scroll bar 1702. Even when the scroll bar 1702 is not directly operated, the scroll can also be performed when the user arranges the dragged photo kept in a dragged stage for a certain period at the end of the upper part or the lower part of the thumbnail list screen 1701.

Figure 17A:
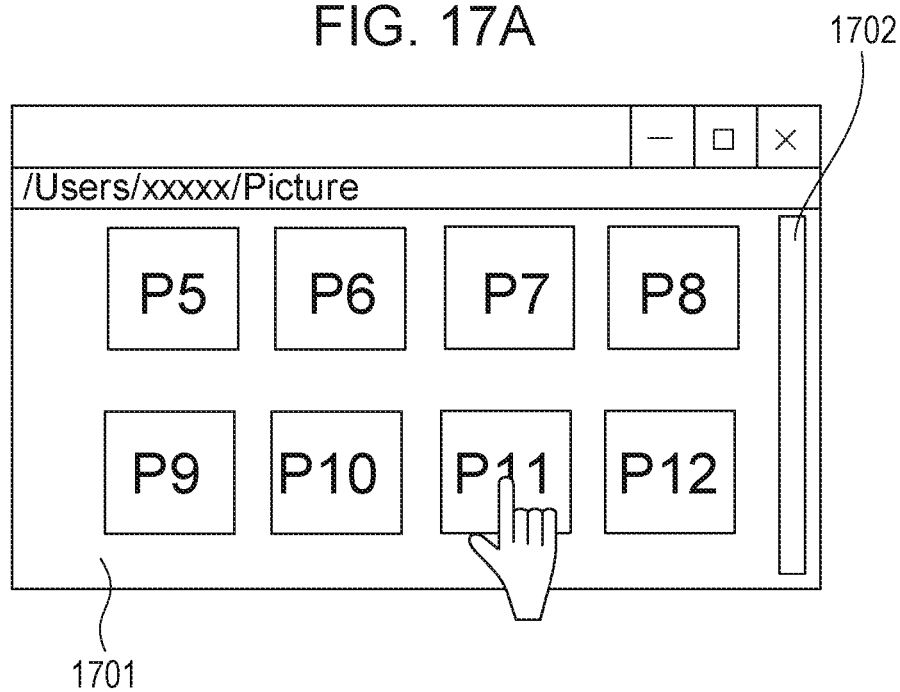
FIGS. 17A to 17H are schematic diagrams for describing the display control method.
Figure 17B:
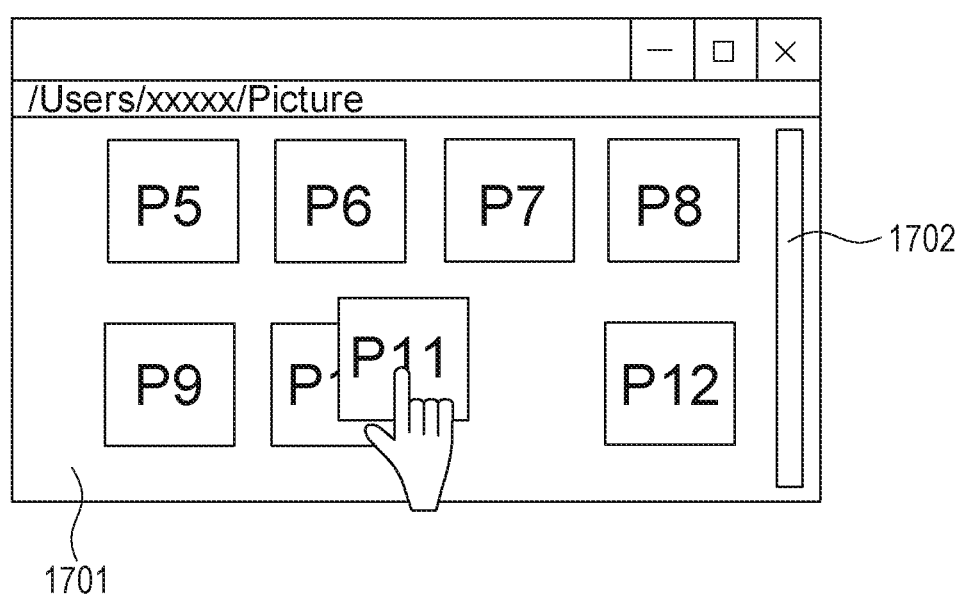

First, in FIG. 17A, the CPU 204 receives the touch input of the photo P11 by the finger, and a dragged state is established as illustrated in FIG. 17B.

In the dragged state illustrated in FIG. 17B, the CPU 204 performs the control in a manner that the finger is sucked into the center of the photo P11. That is, the CPU 204 performs the control in a manner that the center of the photo P11 is matched with the touch position.

Figure 17C:
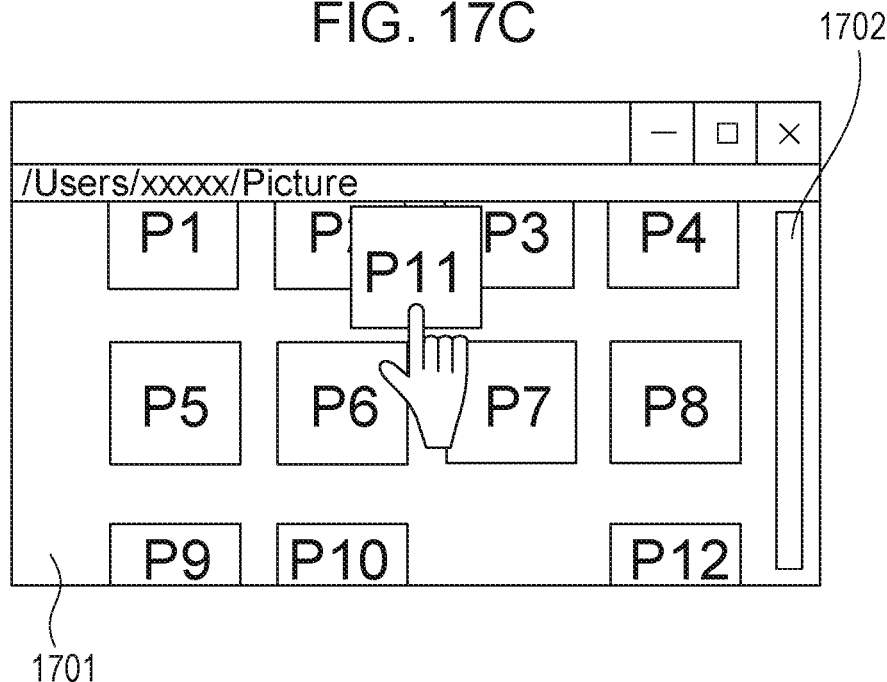

FIG. 17C illustrates a situation where the photo is brought to the upper part of the thumbnail list screen 1701 by the drag operation, and the thumbnail list screen 1701 is accordingly scrolled. The hidden photos P1, P2, P3, and P4 are displayed by the scroll. In FIG. 17C, the CPU 204 performs the control in a manner that the finger is sucked into the lower part of the dragged photo. That is, the relative position of the photo is shifted to the upper side with respect to the touch position. With this configuration, it is possible to decrease the probability that the finger runs off to the outside of the terminal by the erroneous operation at the time of the scroll.

Figure 17D:
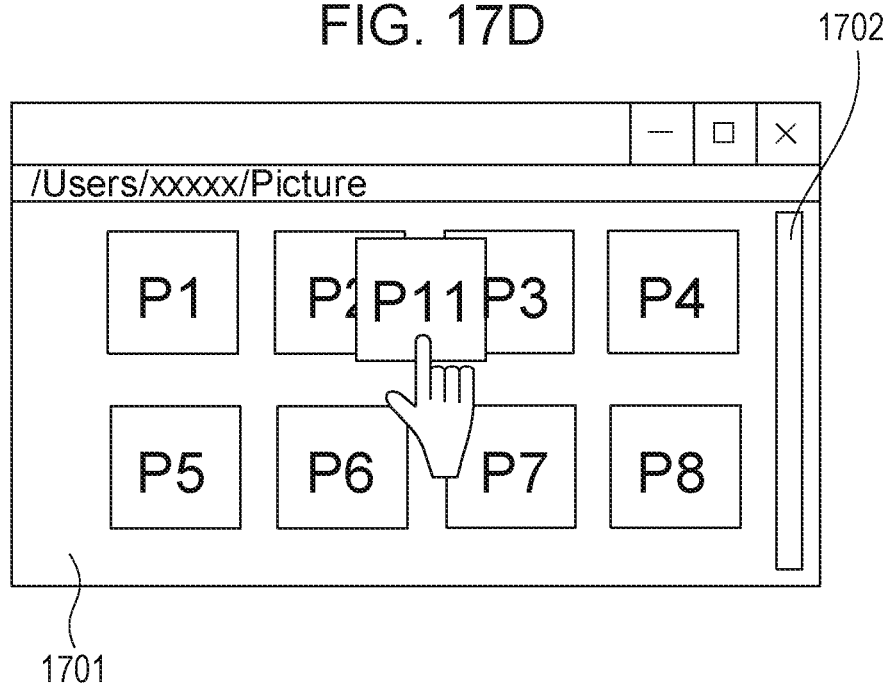

FIG. 17D illustrates a state in which the scroll operation is completed. In this state, when the currently dragged photo P11 is dropped between the photo P2 and the photo P3, a state illustrated in FIG. 17E is established.

Figure 17E:
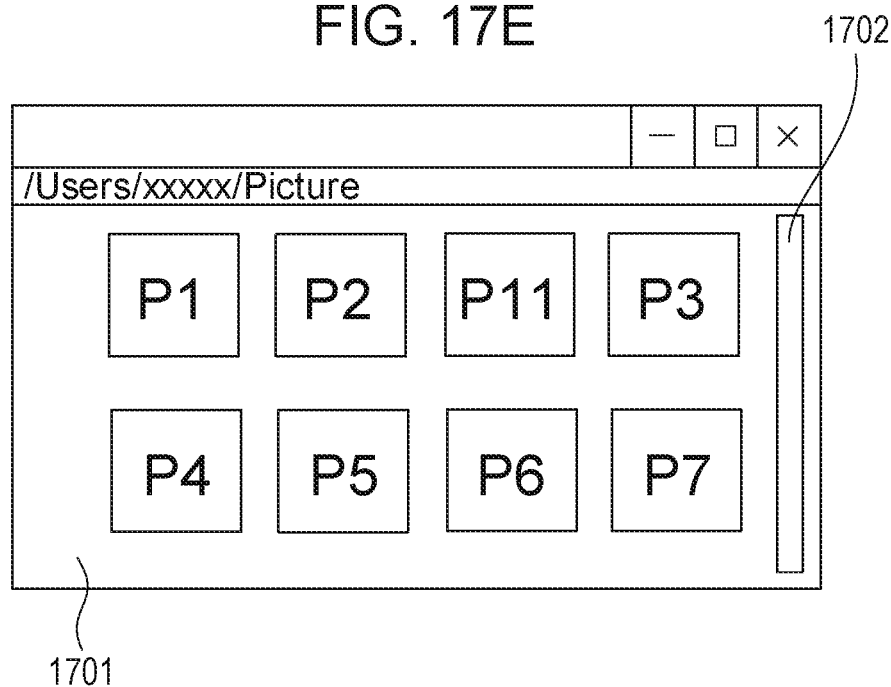

In FIG. 17E, the CPU 204 aligns the dropped P11 between P2 and P3.

Figure 17F:
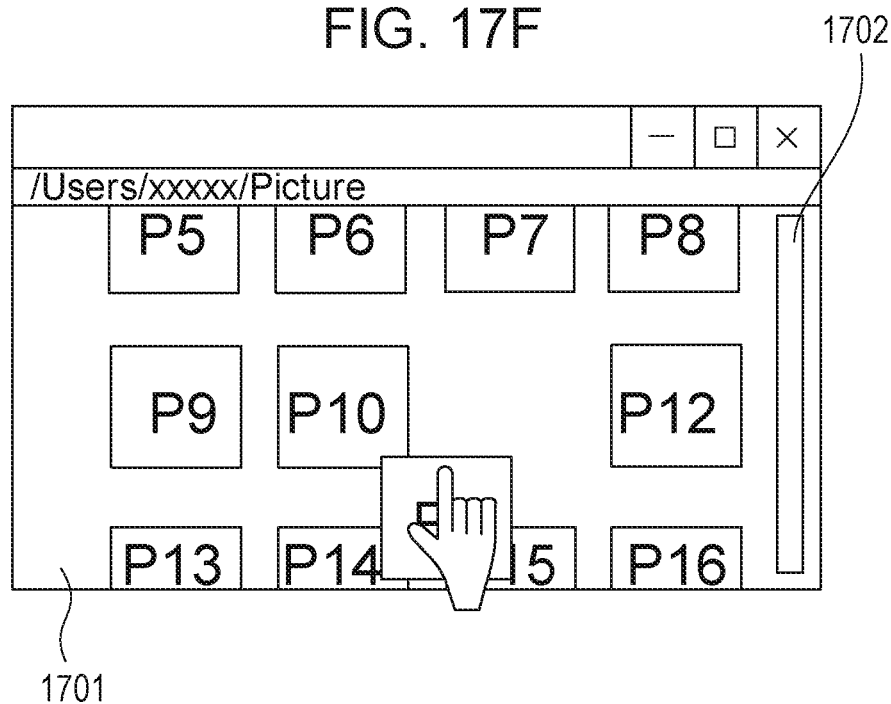

FIG. 17F illustrates a situation where the photo is brought to the lower part of the thumbnail list screen 1701, and the thumbnail list screen 1701 is accordingly scrolled. The hidden photos P13, P14, P15, and P16 are displayed by the scroll. In FIG. 17F, the CPU 204 controls in a manner that the finger is sucked into the upper part of the dragged photo. That is, the relative position of the photo is shifted to the lower side with respect to the touch position. With this configuration, it is possible to decrease the probability that the finger runs off to the outside of the terminal by the erroneous operation at the time of the scroll.

Figure 17G:
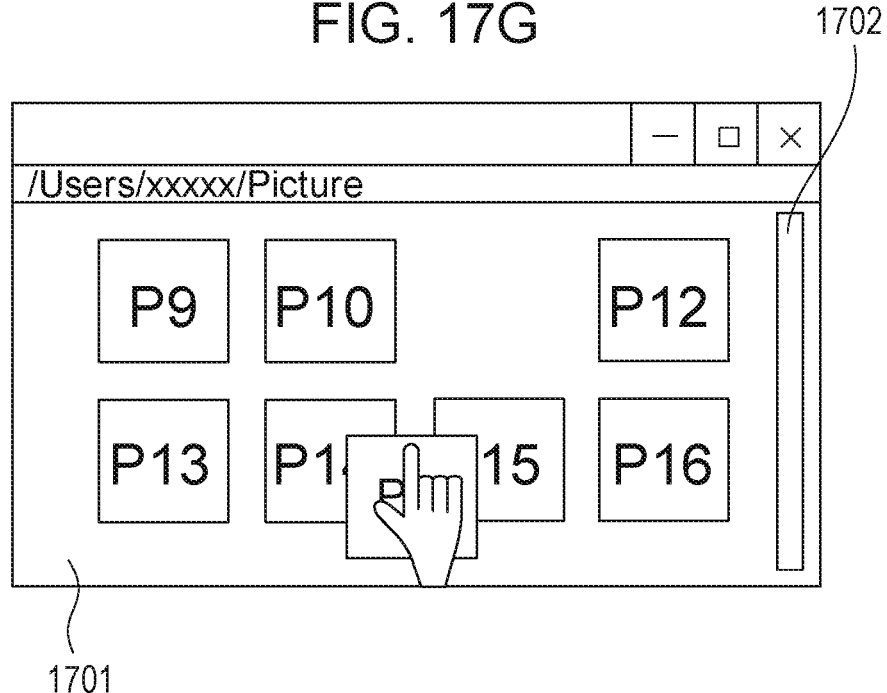

FIG. 17G illustrates a state in which the scroll operation is completed. In this state, when the currently dragged P11 is dropped between P14 and P15, a state illustrated in FIG. 17H is established.

Figure 17H:
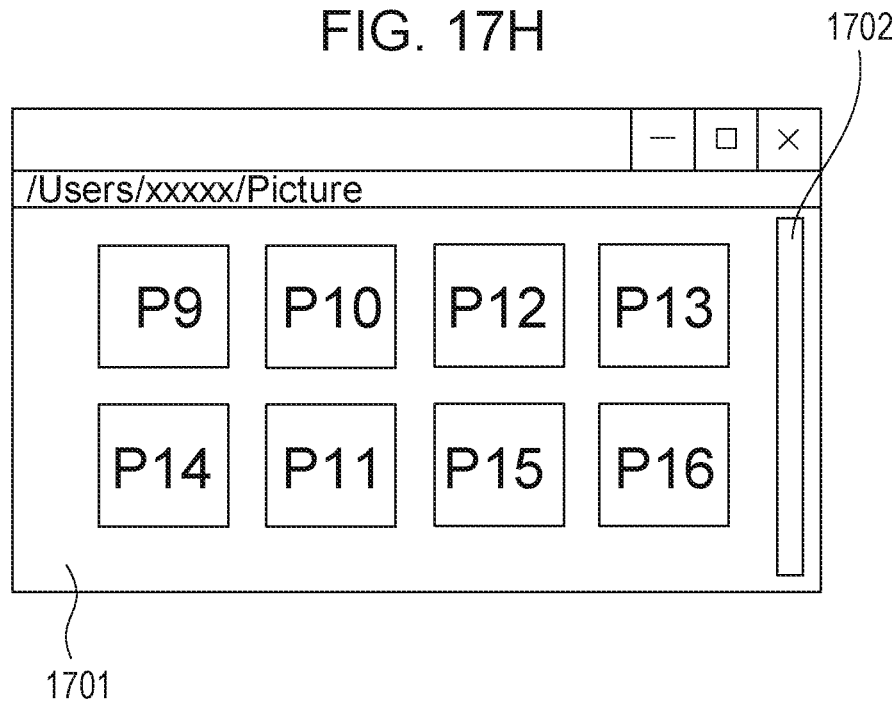

In FIG. 17H, the CPU 204 aligns the dropped P11 between P14 and P15.

As described above, according to the present exemplary embodiment too, when the position where the photo is sucked into the finger or the pen is changed in accordance with the position of the drag, it is possible to decrease the probability that the finger runs off to the outside of the terminal to cancel the drag.

Third Exemplary Embodiment

According to the present exemplary embodiment, an example in which the application icon displayed the display unit of the terminal apparatus such as, for example, the smart phone or the tablet as the item will be described. Since a configuration of the information processing apparatus 1 is similar to that of the first exemplary embodiment, descriptions thereof will be omitted. In addition, with regard to the flow of the display control, different aspects from the first exemplary embodiment will be mainly described.

FIGS. 18A to 18E are schematic diagrams illustrating a home screen 1802 of a terminal apparatus 1801 based on a touch panel system such as the smart phone or the tablet according to the present exemplary embodiment. The home screen 1802 is displayed in a case where a home button 1803 of the terminal apparatus 1801 is pressed, for example. Application icons 1804 are displayed in a list on the home screen 1802. In this example, the application icons 1804 are arranged in each of pages 1 and 2. According to the present exemplary embodiment, the user arranges the application icon on page 1 onto page 2.

Figure 18A:
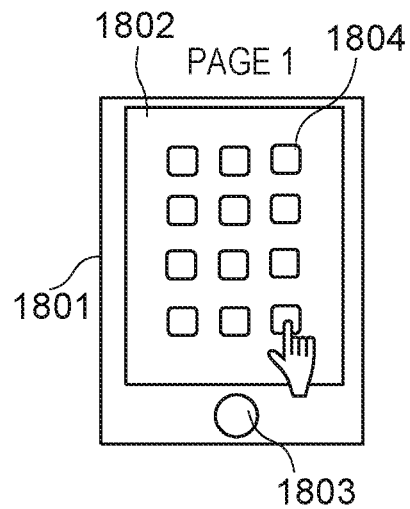
FIGS. 18A to 18E are schematic diagrams for describing the display control method.

FIG. 18A illustrates a state in which page 1 is displayed, and the 12 application icons 1804 are arranged. The application icon on the lower right is dragged and held in FIG. 18A.

Figure 18B:
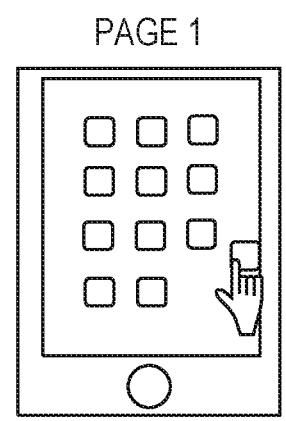
Figure 18C:
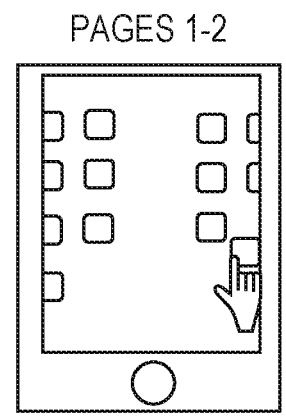

FIG. 18B illustrates a state in which the CPU 204 moves the application icon 1804 to the right end of the panel while keeping the application icon 1804 in the dragged state. When the dragged state is kept at this position for a certain period of time, the displayed page is changed. Specifically, as illustrated in FIG. 18C, the page is changed from page 1 to page 2, and page 2 is displayed in the end as illustrated in FIG. 18D.

Figure 18D:
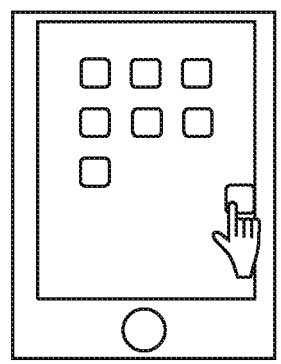

The seven application icons 1804 are arranged on page 2 illustrated in FIG. 18D. It should be noted that after the display of page 2, in a case where the icon is dropped on the arrangement area set within page 2, the CPU 204 arranges the icon in the arrangement area. It should be noted that the arrangement area according to the present exemplary embodiment refers to an area where the icon previously set in the display area can be arranged. It should be noted that, if another icon is already arranged in the arrangement area at the dropped position, the CPU 204 may also move the other icon to another arrangement area. In addition, a folder that includes the other icon and the dropped icon may be newly created. It should be noted that a determination criterion for determining whether or not the icon is on the arrangement area is that the entire area of the icon does not necessarily need to be on the arrangement area as in a case where a predetermined area of the icon (for example, half of the area) is on the arrangement area, a case where a predetermine point on the icon is within a predetermined range in the arrangement area, or the like.

Figure 18E:
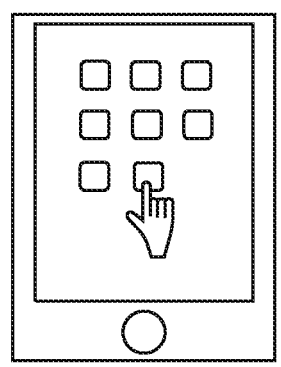

FIG. 18E illustrates a situation where the user releases the finger on the arrangement area on page 2. The CPU 204 releases the drag of the application icon 1804 to arrange the application icon 1804 at the position.

In this manner, according to the present exemplary embodiment, in a state in which the drag is started in FIG. 18A and a state in which the drag is performed in the vicinity of the center of the home screen 1802, the CPU 204 performs the control in a manner that the application icon is sucked into the center of the finger. On the other hand, as illustrated in FIGS. 18B, 18C, and 18D, in a state in which the application icon 1804 is brought to the right end of the terminal apparatus 1801, the CPU 204 performs the control in a manner that the finger is sucked into the left end of the application icon. That is, the relative position of the application icon is shifted to the right side with respect to the input position of the finger. It should be noted that, even when the sucking position is leaning over the left end as illustrated in FIGS. 18A to 18E, the icon may be hidden behind the finger in some cases depending on the size of the icon or the size of the finger. When the icon is hidden behind the finger, it is difficult for the user to understand the position of the icon, and it is difficult to attain the benefit of the decreased probability that the finger runs off from the frame of the touch panel in some cases. In view of the above, as illustrated in FIGS. 20A to 20E, the control may also be performed in a manner that the sucking position is set to be farther away from the end of the icon to be sucked into a position away from the icon. That is, the control may be performed in a manner that the relative position of the icon is further shifted with respect to the touch position so that the icon is set to be away from the touch position.

Figure 20A:
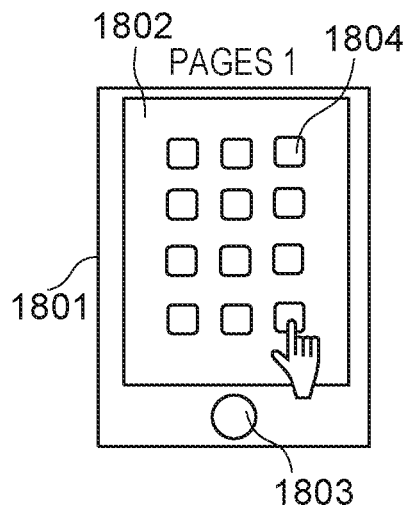
FIGS. 20A to 20E are schematic diagrams for describing the display control method.
Figure 20B:
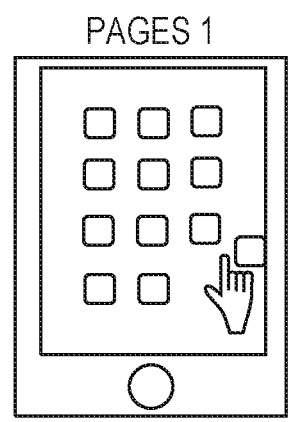
Figure 20C:
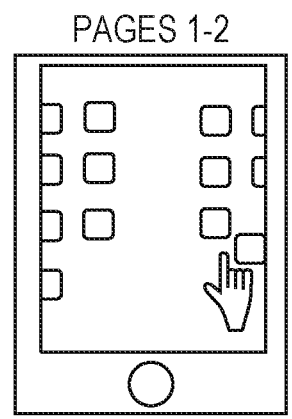
Figure 20D:
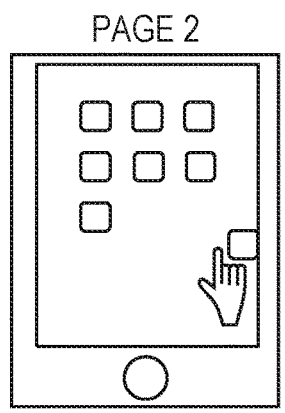
Figure 20E:
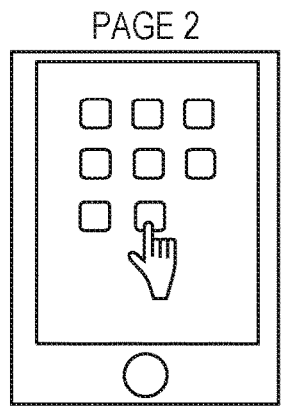

In FIGS. 20B-D, the icon is dragged, but the sucking position is away from the hand. When the object is set to be away from the sucking position in the above-described manner, since the icon reaches the display area end part at a still earlier timing, it is possible to perform the page turning without bringing the icon to the end.

As described above, according to the present exemplary embodiment too, the position where the icon is sucked into the finger or the pen is changed in accordance with the position of the drag, and it is therefore possible to decrease the probability that the finger runs off to the outside of the terminal to cancel the drag.

Other Exemplary Embodiments

According to the above-described exemplary embodiment, the example has been described in which the photo after the layout or the application icon is used as the item, but the configuration is also realized by another item. For example, a display item such as an image other than the photo, a text box, an operation button, a short cut, or contents may also be used.

In addition, according to the above-described exemplary embodiment, the CPU 204 performs the control of the display of the item, but a graphics processing unit (GPU) may perform the control of the display of the item.

Moreover, according to the above-described exemplary embodiment, the example has been described in which the terminal apparatus such as the smart phone or the tablet is used as the information processing apparatus 1, the configuration is also realized by another apparatus. For example, a PC or an image processing apparatus such as a printer may also be used.

According to the above-described respective exemplary embodiments, the configuration has been described while the operation is performed by the finger or the pen in the terminal based on the touch panel system, but the present disclosure is not limited to the above. The configuration may also be applied to an operation by a pointing device such as a mouse. For example, when the dragged icon approaches an external frame of the application window by the mouse operation, a position of a mouse cursor that holds the icon may be changed.

Embodiment(s) of the present disclosure can also be realized by a computerized configuration(s) of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computerized configuration(s) of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computerized configuration(s) may comprise one or more processors, one or more memories, circuitry, or a combination thereof (e.g., central processing unit (CPU), micro processing unit (MPU)), and may include a network of separate computers or separate processors to read out and execute the computer executable instructions. The computer executable instructions may be provided to the computerized configuration(s), for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the exemplary embodiments of the present disclosure, it is possible to further improve the usability for the user when the item is moved.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of priority from Japanese Patent Application No. 2017-193783 filed Oct. 3, 2017, which is hereby incorporated by reference herein in its entirety.

What is claimed is:

1. An information processing apparatus that displays an item in a display area of a display unit, the information processing apparatus comprising:
   at least one processor causing the information processing apparatus to act as:
   a control unit configured to control movement of the item in accordance with a drag operation by a user; and
   an obtaining unit configured to obtain an input position of the drag operation by the user in the display area,
   wherein, in a case where the item that is arranged at a predetermined position among a plurality of arrangement positions on a predetermined page reaches a first end part in the display area by the drag operation, another page different from the predetermined page is displayed in the display area and in a case where the item that is arranged at the predetermined position on the predetermined page reaches a second end part opposite from the first end part in the display area by the drag operation, still another page different from both of the predetermined page and the another page is displayed in the display area, wherein, in a case where the item that is arranged at the predetermined position on the predetermined page is moved by the drag operation, the drag operation is started such that a certain part of the item is held by the user at the predetermined position, the drag operation is performed such that a first part of the item is held by the user at a position where the item being dragged is coming closer to the first end part than the predetermined position is to the first end part, wherein the first part is a part that is closer to the second end part than the certain part is to the second end part, and the drag operation is performed such that a second part of the item is held by the user at a position where the item being dragged is coming closer to the second end part than the predetermined position is to the second end part, wherein the second part is a part that is closer to the first end part than the certain part is to the first end part, wherein, in a case where the drag operation of the item is released and the item is dropped on an area other than the plurality of arrangement positions in the display area, the control unit performs return processing that returns the item to the predetermined position, wherein, in a case where a user input to the item is accepted before the dropped item returns to the predetermined position, the control unit stops the return processing whereby the drag operation is able to be resumed, and wherein, in a case where a user input to a position other than the item is accepted before the dropped item is returned to the predetermined position, the control unit stops the return processing and moves the item to the position corresponding to the user input whereby the drag operation is able to be resumed from the position corresponding to the user input.

2. The information processing apparatus according to claim 1, wherein the display is performed such that, based on the input position, the closer the item is to the first end part, the closer the part of the item held by the user is to the second end part.

3. The information processing apparatus according to claim 1, wherein the part of the item held is the same irrespective of the position where the item is arranged in a timing when the item arranged in the display area is held before the drag operation, and the part of the item held changes when the item is moved by the drag operation.

4. The information processing apparatus according to claim 1, wherein, in a case where the item is located at a central part in the display area by the drag operation, a central part of the item is held by the user.

5. The information processing apparatus according to claim 1,
wherein the item is arranged in the another page when the item dragged in the different page is dropped.

6. The information processing apparatus according to claim 1, wherein a page change area for changing a page to be displayed in the display area is arranged in the first end part in the display area, and the page to be displayed changes when the item is moved to the first end part and at least part of the item is overlapped with the page change area.

7. The information processing apparatus according to claim 1, wherein the at least one processor further causes the information processing apparatus to act as:
a layout unit configured to arrange an image in a slot in a template to perform layout,
wherein, after the layout unit performs the layout, the control unit moves the image arranged in the slot as the item in accordance with the drag operation by the user.

8. The information processing apparatus according to claim 1,
wherein the item is an icon of a predetermined application, and
wherein the control unit moves the icon in accordance with the drag operation by the user.

9. A display control method of displaying an item in a display area on a display unit, the display control method comprising:
controlling movement of the item displayed in the display area on the display unit in accordance with a drag operation by a user; and
obtaining an input position of the drag operation by the user in the display area, wherein, in a case where the item that is arranged at a predetermined position among a plurality of arrangement positions on a predetermined page reaches a first end part in the display area by the drag operation, another page different from the predetermined page is displayed in the display area and in a case where the item that is arranged at the predetermined position on the predetermined page reaches a second end part opposite from the first end part in the display area by the drag operation, still another page different from both of the predetermined page and the another page is displayed in the display area, wherein, in a case where the item that is arranged at the predetermined position on the predetermined page is moved by the drag operation, the drag operation is started such that a certain part of the item is held by the user at the predetermined position, the drag operation is performed such that a first part of the item is held by the user at a position where the item being dragged is coming closer to the first end part than the predetermined position is to the first end part, wherein the first part is a part that is closer to the second end part than the certain part is to the second end part, and the drag operation is performed such that a second part of the item is held by the user at a position where the item being dragged is coming closer to the second end part than the predetermined position is to the second end part, wherein the second part is a part that is closer to the first end part than the certain part is to the first end part, wherein, in a case where the drag operation of the item is released and the item is dropped on an area other than the plurality of arrangement positions in the display area, the control unit performs return processing that returns the item to the predetermined position, wherein, in a case where a user input to the item is accepted before the dropped item returns to the predetermined position, the control unit stops the return processing whereby the drag operation is able to be resumed, and wherein, in a case where a user input to a position other than the item is accepted before the dropped item is returned to the predetermined position, the control unit stops the return processing and moves the item to the position corresponding to the user input whereby the drag operation is able to be resumed from the position corresponding to the user input.

10. The display control method according to claim 9, wherein the display is performed such that, based on the input position, the closer the item is to the first end part, the closer the part of the item held by the user is to the second end part.

11. The display control method according to claim 9, wherein the part of the item held is the same irrespective of the position where the item is arranged in a timing when the item arranged in the display area is held before the drag operation, and the part of the item held changes when the item is moved by the drag operation.

12. The display control method according to claim 9, wherein, in a case where the item is located at a central part in the display area by the drag operation, a central part of the item is held by the user.

13. The display control method according to claim 9, wherein the item is arranged in the another page when the item dragged in the different page is dropped.

14. The display control method according to claim 9, wherein a page change area for changing a page to be displayed in the display area is arranged in the first end part in the display area, and the page to be displayed changes when the item is moved to the first end part and at least part of the item is overlapped with the page change area.

15. The display control method according to claim 9, further comprising:
 arranging an image in a slot in a template to perform layout,
 wherein, after the layout is performed, the image arranged in the slot as the item is moved in accordance with the drag operation by the user.

16. The display control method according to claim 9, wherein the item is an icon of a predetermined application, and
 wherein the icon is moved in accordance with the drag operation by the user.

17. A non-transitory storage medium storing a program for causing a computer to execute a display control method of displaying an item in a display area on a display unit, the display control method comprising:
 controlling movement of the item displayed in the display area on the display unit in accordance with a drag operation by a user; and
 obtaining an input position of the drag operation by the user in the display area, wherein, in a case where the item that is arranged at a predetermined position among a plurality of arrangement positions on a predetermined page reaches a first end part in the display area by the drag operation, another page different from the predetermined page is displayed in the display area and in a case where the item that is arranged at the predetermined position on the predetermined page reaches a second end part opposite from the first end part in the display area by the drag operation, still another page different from both of the predetermined page and the another page is displayed in the display area, wherein, in a case where the item that is arranged at the predetermined position on the predetermined page is moved by the drag operation, the drag operation is started such that a certain part of the item is held by the user at the predetermined position, the drag operation is performed such that a first part of the item is held by the user at a position where the item being dragged is coming closer to the first end part than the predetermined position is to the first end part, wherein the first part is a part that is closer to the second end part than the certain part is to the second end part, and the drag operation is performed such that a second part of the item is held by the user at a position where the item being dragged is coming closer to the second end part than the predetermined position is to the second end part, wherein the second part is a part that is closer to the first end part than the certain part is to the first end part, wherein, in a case where the drag operation of the item is released and the item is dropped on an area other than the plurality of arrangement positions in the display area, the control unit performs return processing that returns the item to the predetermined position, wherein, in a case where a user input to the item is accepted before the dropped item returns to the predetermined position, the control unit stops the return processing whereby the drag operation is able to be resumed, and wherein, in a case where a user input to a position other than the item is accepted before the dropped item is returned to the predetermined position, the control unit stops the return processing and moves the item to the position corresponding to the user input whereby the drag operation is able to be resumed from the position corresponding to the user input.

* * * * *